United States Patent [19]
Watkins, Jr. et al.

[11] Patent Number: 5,862,030
[45] Date of Patent: Jan. 19, 1999

[54] ELECTRICAL SAFETY DEVICE WITH CONDUCTIVE POLYMER SENSOR

[75] Inventors: Kenneth S. Watkins, Jr., Lumpkin County, Ga.; Shelby J. Morris, Jr., Hampton, Va.

[73] Assignee: BPW, Inc., Cumming, Ga.

[21] Appl. No.: 89,037

[22] Filed: Jun. 2, 1998

Related U.S. Application Data

[63] Continuation-in-part of Ser. No. 826,780, Apr. 7, 1997, Pat. No. 5,841,617.

[51] Int. Cl.$^6$ .................................................... H02H 5/04
[52] U.S. Cl. ........................... 361/103; 361/106; 219/494
[58] Field of Search .................................... 361/103, 106, 361/93; 219/110, 241, 485, 491, 494, 497, 510; 174/102 R, 103, 104, 105 R, 107, 110 R, 128.2, 138 J

[56] References Cited

U.S. PATENT DOCUMENTS

| | | | |
|---|---|---|---|
| 4,575,620 | 3/1986 | Ishii et al. | 219/549 |
| 4,577,094 | 3/1986 | Mills | 219/505 |
| 4,668,857 | 5/1987 | Smucker | 219/549 |
| 4,891,500 | 1/1990 | Bloore | 219/505 |
| 5,143,649 | 9/1992 | Blackledge et al. | 252/511 |
| 5,424,895 | 6/1995 | Gaston | 361/46 |
| 5,541,803 | 7/1996 | Pope, Jr. et al. | 361/103 |
| 5,554,679 | 9/1996 | Cheng | 524/495 |

*Primary Examiner*—Jeffrey Gaffin
*Assistant Examiner*—Michael J. Sherry
*Attorney, Agent, or Firm*—Kenneth S. Watkins, Jr.

[57] ABSTRACT

An electrical safety device comprises a sensor strip disposed in the insulation of a wire or in the insulation of a sheath enclosing a bundle of insulated electrical conductors. The sensor strip comprises a distributed overtemperature sensing portion comprising a conductive polymer having a positive temperature coefficient of resistivity which increases with temperature sufficient to result in a switching temperature. A mechanical damage sensing portion comprises a strip disposed in the sheath in a mechanical damage sensing pattern which becomes damaged or open upon mechanical damage of the sheath before the bundle of conductors are damaged. The overtemperature sensing portion and the mechanical damage sensing portion may be the same sensing strip disposed in the sheath and arranged in a helical relationship with a longitudinal axis of the sheath.

32 Claims, 21 Drawing Sheets

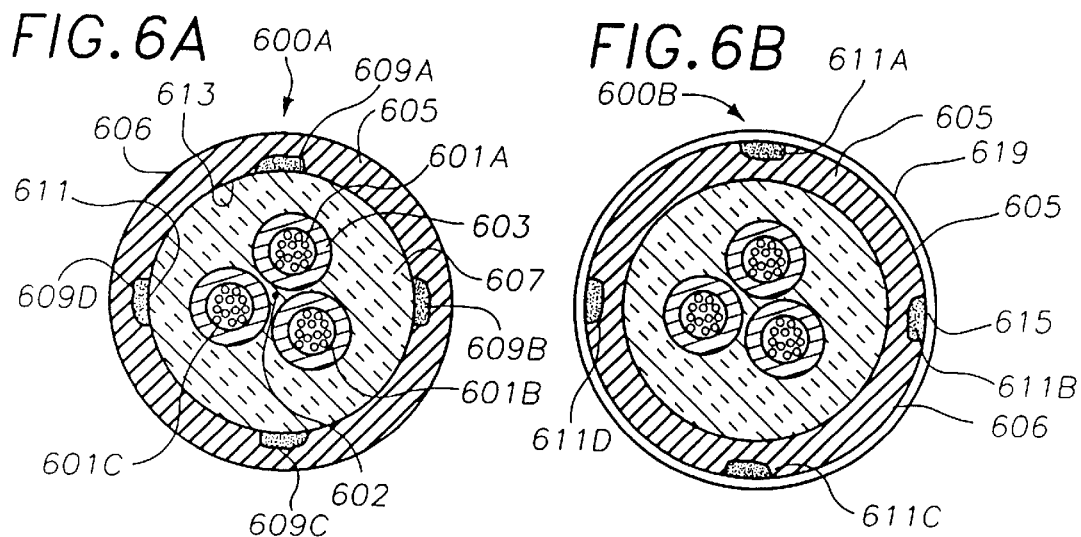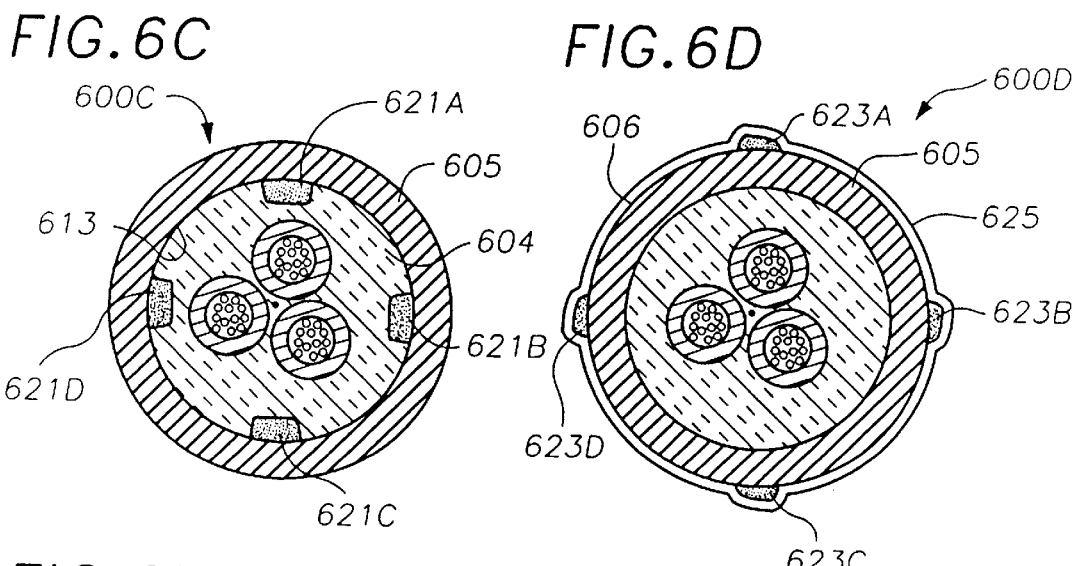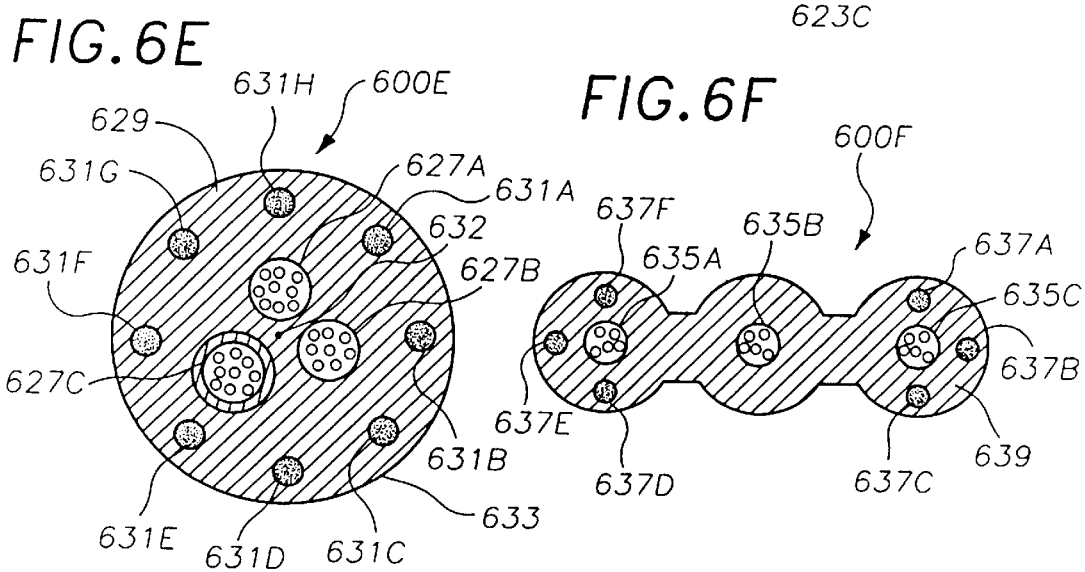

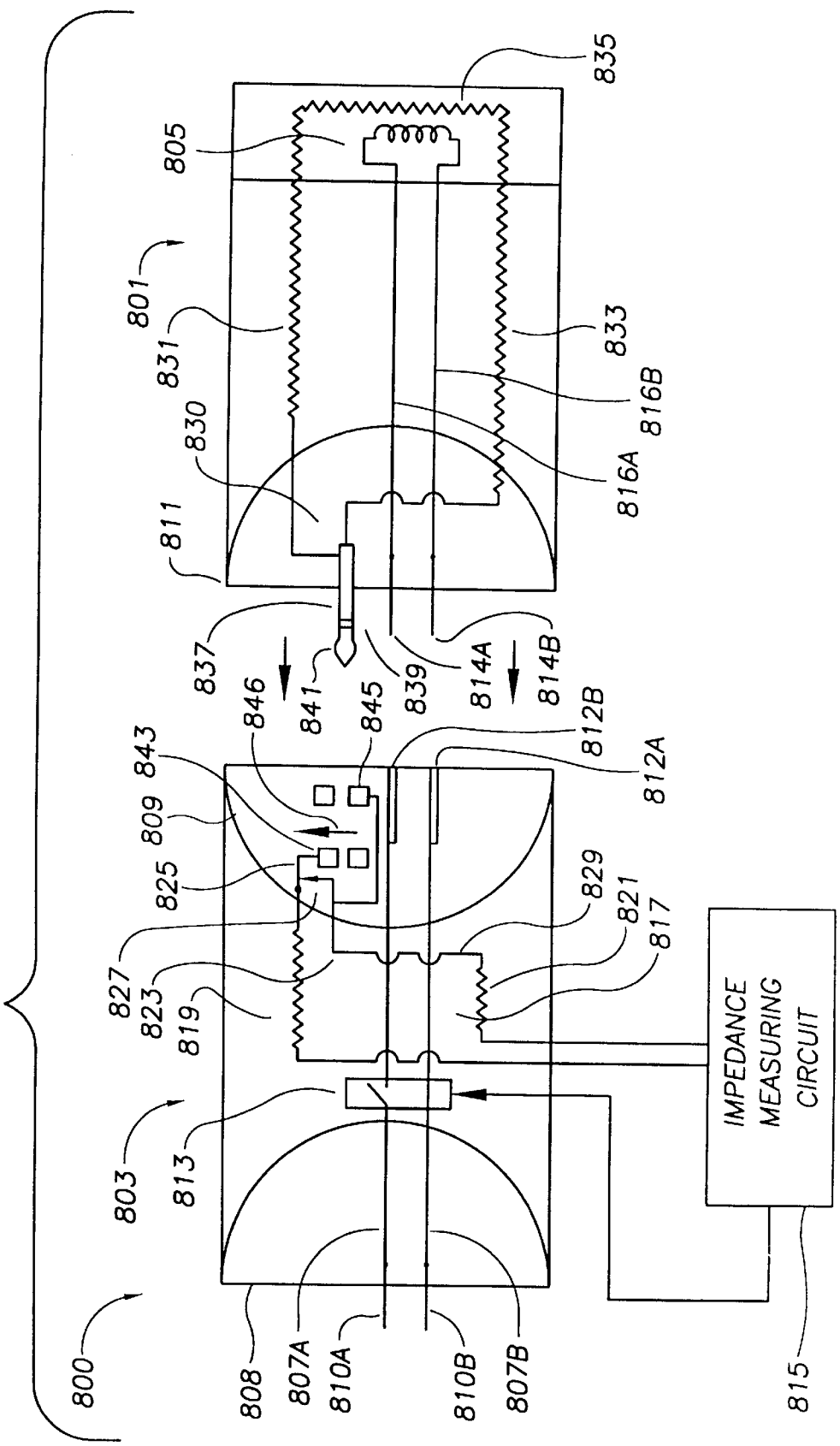

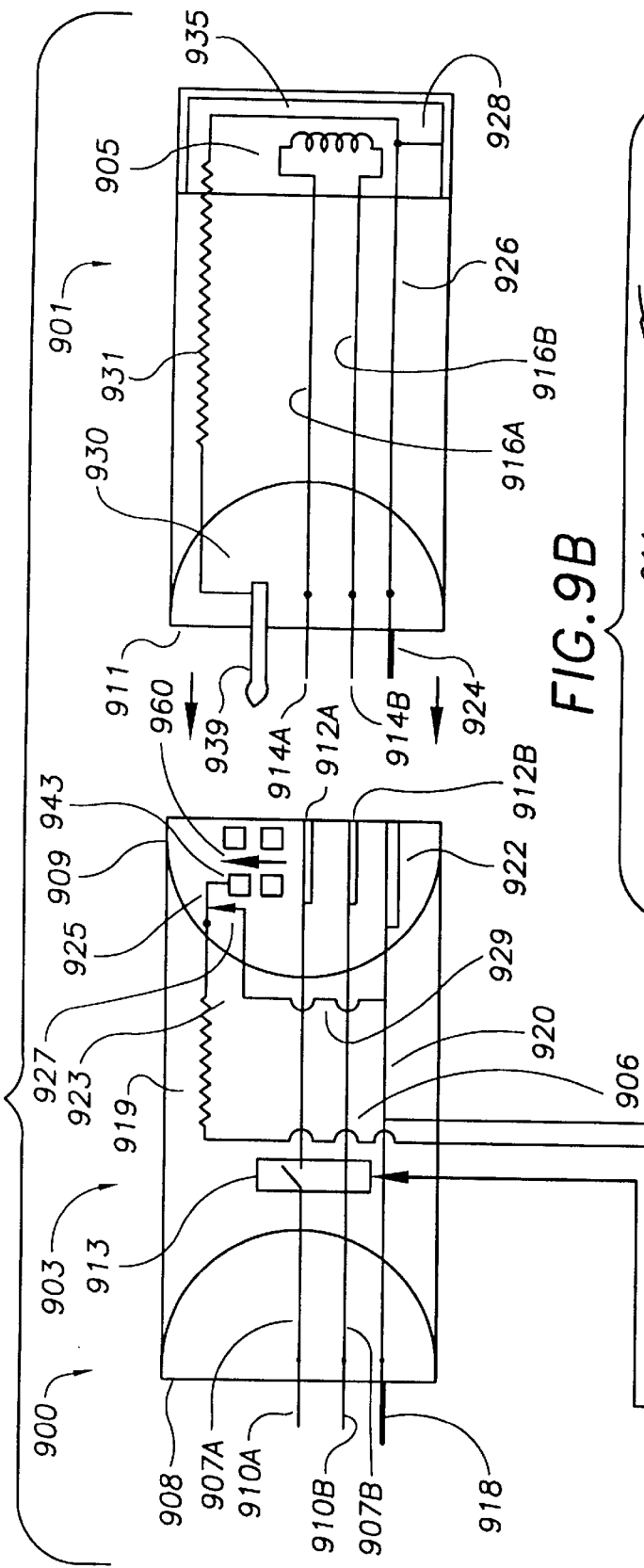
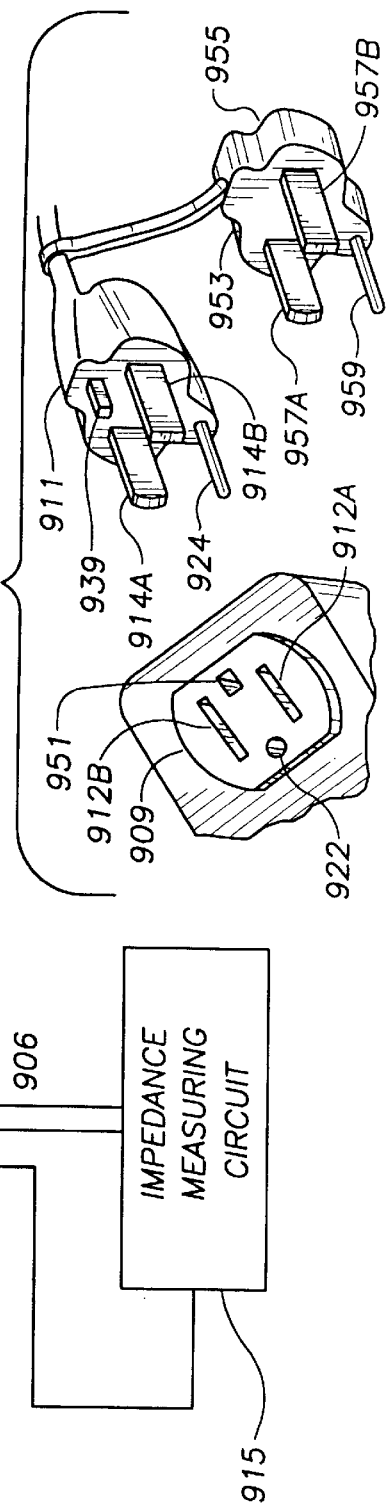
FIG. 9A
FIG. 9B

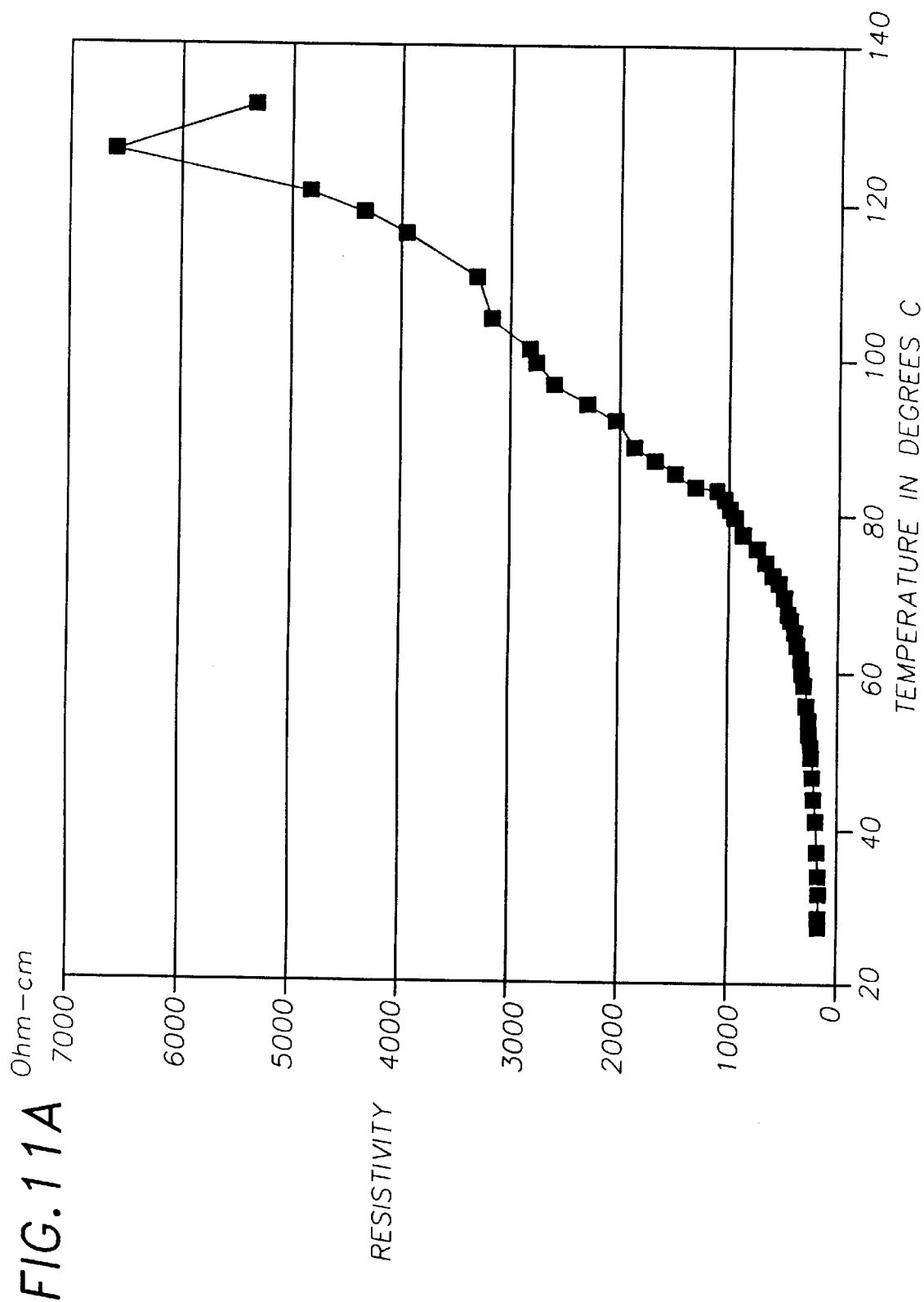

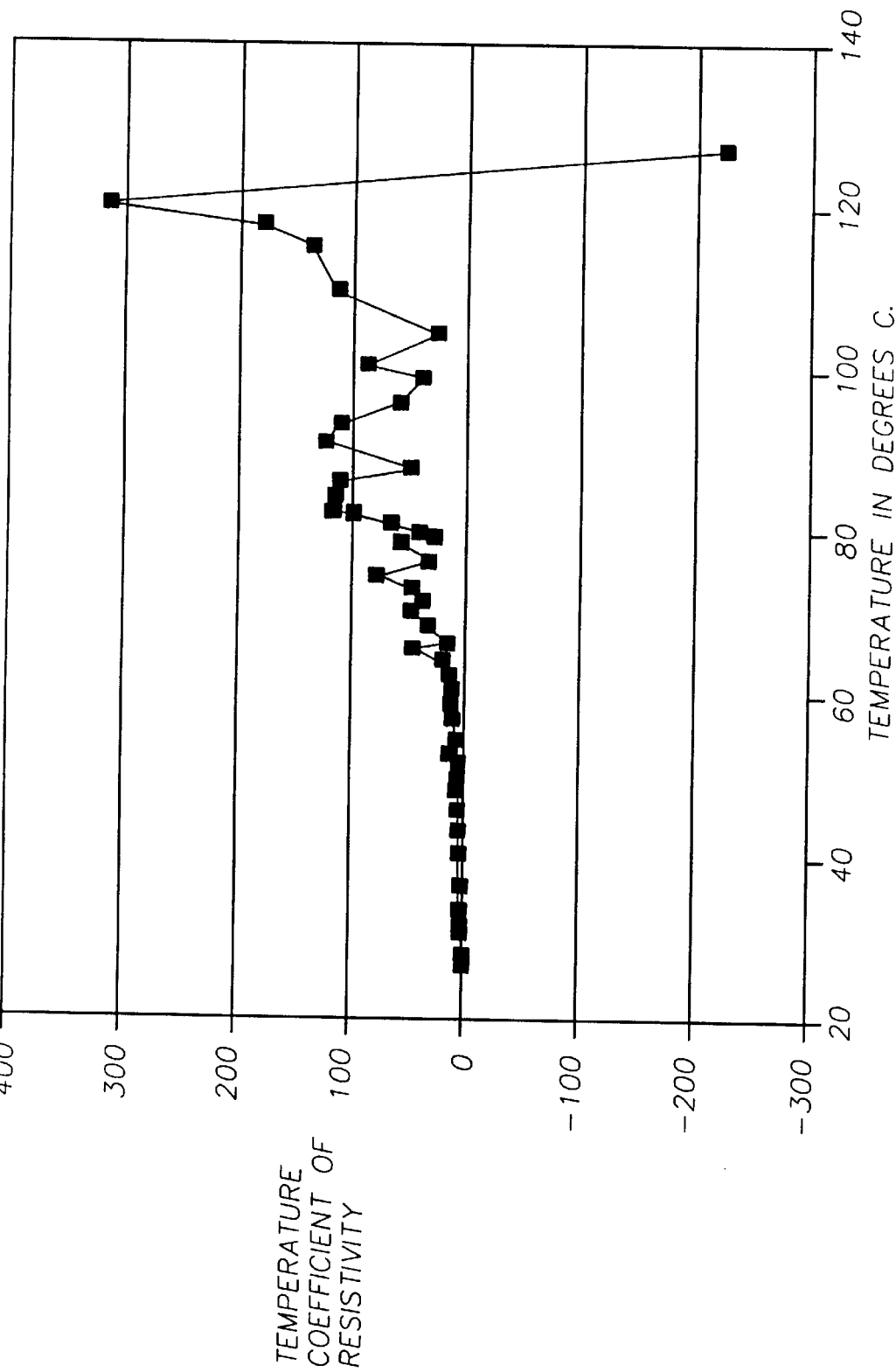

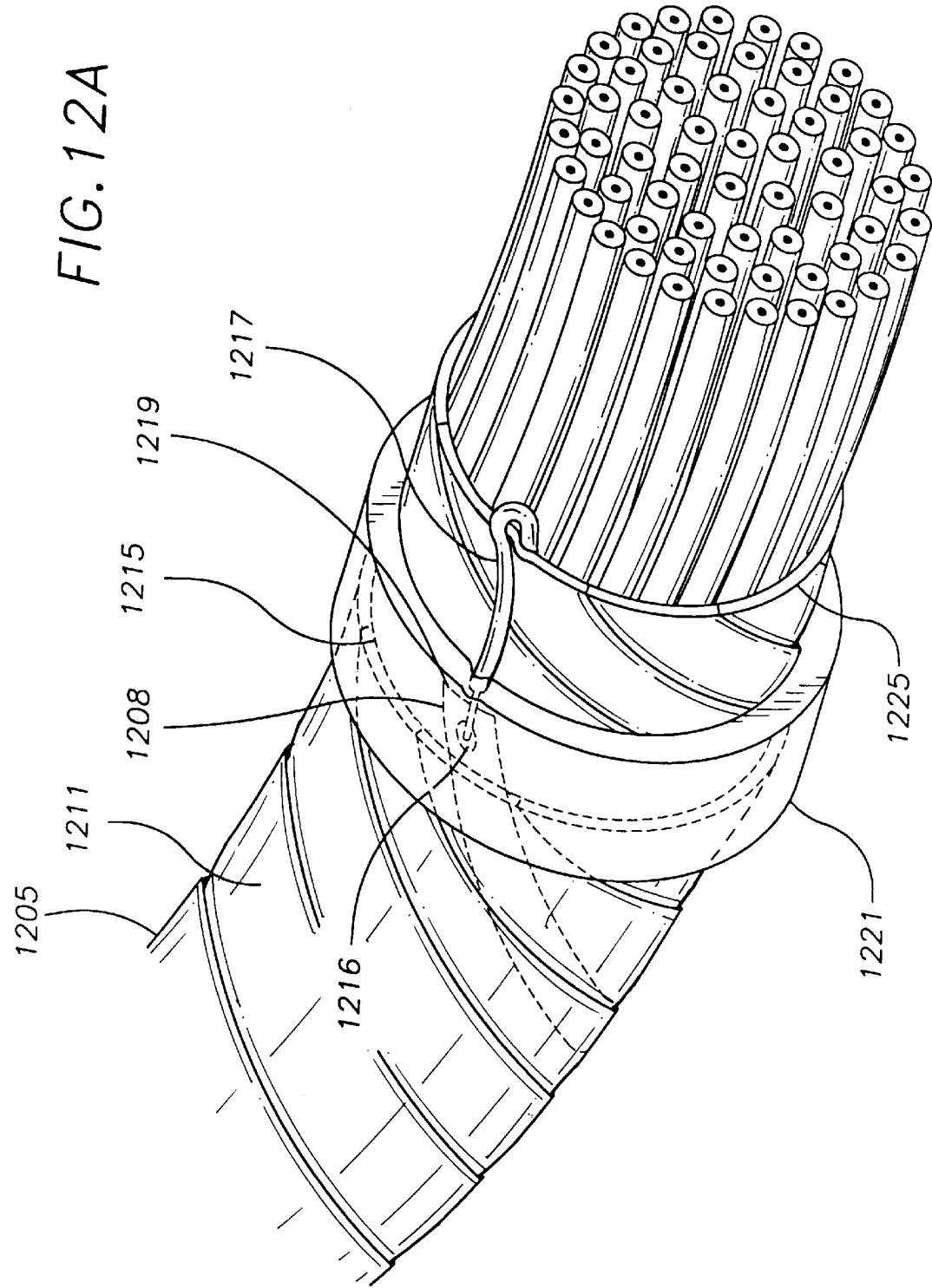

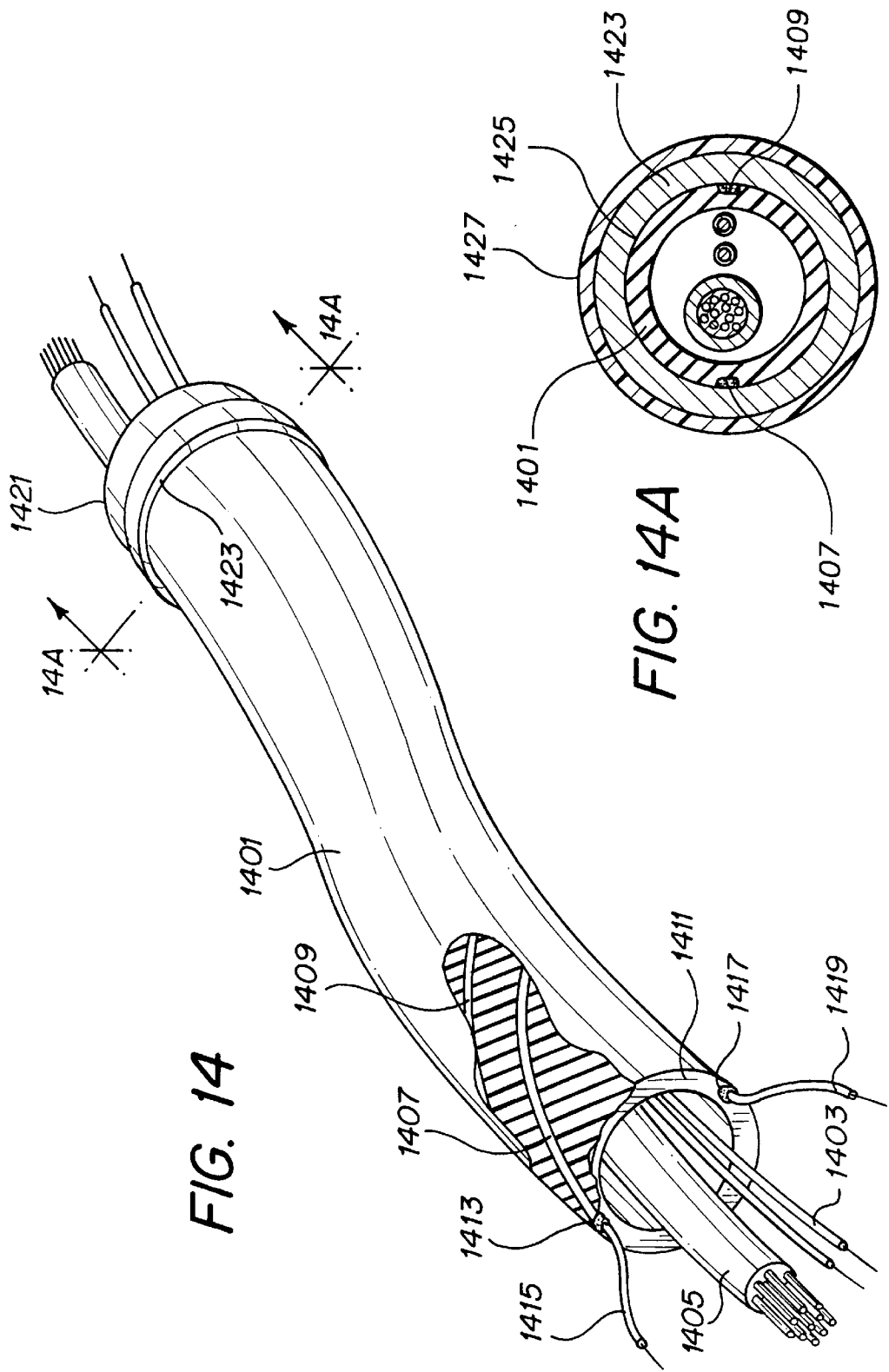

ELECTRICAL SAFETY DEVICE WITH CONDUCTIVE POLYMER SENSOR

The present application is a continuation-in-part of application Ser. No. 08/826,780, filed Apr. 07, 1997, now U.S. Pat. No. 5,841,617. Related U.S. Pat. No. 5,541,803, issued Jun. 30, 1996, and related provisional application number 60/069,046, filed Dec. 10, 1997, are hereby incorporated by reference.

BACKGROUND OF THE INVENTION

The present invention relates to electrical safety devices and, more particularly, to overtemperature and mechanical damage sensors for electrical wire, cable, cords and appliances.

Historically, electrical apparatus have depended on overcurrent devices such as circuit breakers and fuses to protect the apparatus from overtemperature conditions which might lead to equipment damage or personnel injury resulting from fire or smoke. Overcurrent devices suffer from limitations in their effectiveness, in that overtemperature conditions can result from normal current flow through equipment suffering from damaged conductors or poor electrical connections. For example, an electrical cord containing stranded wire conductors may overheat if some of the strands are broken, even if less than rated current flows through the cord. Many fires have been caused due to poor connections in plugs, receptacles, and connection strips in cords and appliances.

Ground fault interrupters (GFI) are another common safety device used in electrical equipment. While such devices are effective in reducing electrical shock and equipment damage due to shorts to ground, they are ineffective in cases where the fault does not result in current flow to ground. For example, a GFI will not prevent a fire in the case of broken conductor strands or poor connections because no ground current flow occurs. Neither GFIs nor overcurrent devices protect a cord or device from overtemperature conditions resulting from external sources of heat such as excessive ambient temperature conditions or contact with hot burners, hot piping, etc. Neither device may be effective if the cord is unable to dissipate normal heat. For example, the cord or appliance may become covered with thermally insulating material that prevents dissipation of heat due to normal current flow.

Temperature sensors such as resistance temperature sensors (RTDs) and thermistors are commonly used to detect overtemperature conditions in equipment. These devices may be used to initiate alarms or relays to interrupt current to the device upon overtemperature. While these devices are effective in sensing temperature in a small or enclosed space, they are ineffective in sensing overtemperature over a long distance or in a large volume unless many devices are employed. Use of sufficient devices for sensing temperature over a long distance or large volume raises the cost of protection substantially. Also, the wiring needed for connecting a large number of sensors complicates the device and increases the size and bulk of the device.

None of the devices above provides protection from mechanical damage to cords or equipment cases which may result in exposed conductors or internal shorts. None of the devices provides protection from shock or fire from damaged electrical cords or equipment until a sufficient fault current begins to flow. For example, a person using a faulty piece of equipment with ground fault interruption who establishes a ground path must experience a momentary shock in order for the interrupter to open the circuit.

None of the devices above provides protection from mechanical damage or overtemperature for a bundle of wires or cables.

OBJECTS AND SUMMARY OF THE INVENTION

Therefore an object of the present invention is to provide an electrical safety device for power cords, appliances and other electrical apparatus which is capable of sensing an overtemperature condition over an extended length of the power cord, or over an extended surface of an electrical appliance.

A further object of the present invention is to provide an electrical safety device to prevent overheating of power cords and appliances which have damaged conductors or poor connections in plugs, receptacles, or connections.

A further object of the present invention is to provide an electrical safety device which provides protection for electrical cords or appliances which experience mechanical damage which could result in exposed conductors, internal shorts or shorts to ground.

A further object of the present invention is to provide an electrical safety device for power cords and appliances which provides protection from excessive ambient temperatures or contact with hot equipment.

Yet another object of the present invention is to provide an electrical safety device for power cords and appliances which provides a method to interconnect protected devices without additional interrupters, thus reducing the cost of protection.

A further object of the present invention is to provide an electrical safety device for power cords and appliances which is suitable for integration with ground fault protection and/or overcurrent protection with the features of the present invention.

Another object of the present invention is to provide a sheath which provides overtemperature and mechanical damage sensing capability for a bundle of wires or cables, the sheath being quick and easy to install over the bundle.

The electrical safety device of the present invention comprises at least one sensor strip disposed as a continuous loop in the electrical cord or the casing of an electrical apparatus. Examples of apparatus which may be protected include extension cords, power cords of appliances or tools, power strips, computers, electronic equipment, and commercial and industrial electrical equipment. A controller such as an impedance measuring circuit measures the electrical impedance or resistance of the sensor loop and activates an interrupter or relay in series with a conductor in the cord supplying power to the apparatus. A sufficient increase in the resistance of the sensor will open the relay, stopping flow of current through the apparatus. The sensor strip extends along a substantial length of the cord. In one embodiment, the sensor strip extends from the plug to the second end of the cord attached to the apparatus. In other embodiments, the sensor strip extends into an appliance or tool.

The sensor strip is made of an electrically conductive polymer having a positive temperature coefficient of resistivity which increases with temperature. In other words, the increase in the resistance of the sensor strip over a given temperature rise is greater at a higher temperature than at a lower temperature. In the ideal case, the conductive polymer has a relatively low resistance below a temperature which may damage the insulation or other materials in the apparatus, and infinitely high resistance at temperatures which may cause damage.

The "switching" effect described above allows temperature sensing over an extended length of a cord because the resulting increase in resistance will be substantial enough to cause the circuit to trip even if a short length of the cord is overheated. The high magnitude of change of resistance at temperatures near the desired trip temperature is important because other factors such as high ambient temperature, heating due to normal current flow, or normal strain on the cord will also cause increases in resistance. If the change in resistance over a given temperature range was generally constant, (as in the case of many metals) a small temperature change over the length of the cord would cause the same resistance change as a large (and perhaps damaging) change in a short length of the sensor strip.

Many conductive polymers exhibit a positive temperature coefficient (PTC) of resistivity which increases with temperature. These materials include both intrinsically conductive polymers and polymers filled with conductive particles or fibers such as carbon and metals. The conductive polymers of the present invention should show an increase in PTC of the material of at least an order of magnitude between 30 degrees centigrade and a specified maximum allowable temperature prior to the softening, melting or charring point of the insulation of the cord. The maximum allowable temperature will depend on the insulation and other materials used in the apparatus, and will typically be between 75 and 200 degrees centigrade. In other embodiments, the increase in PTC from a maximum expected operating temperature to the maximum allowable temperature is greater than 2 orders of magnitude. In the preferred embodiments, the increase in PTC from the maximum expected operating temperature to the maximum allowable temperature is greater than 3 orders of magnitude.

In the preferred embodiments of the present invention, at least two sensor strips are positioned in the cord between the conductors and the nearest outside surface of the cord. Positioned in this way, damage or abrasion of the power cord will result in an open circuit in the sensor strip before the conductor is exposed. The sensor strips are connected in series by a shunt located in at least one end of the cord so that an open circuit in any strip is sensed as a high resistance by the resistance measuring circuit which opens the relay or interrupter. Preferably, enough series connected sensor strips are positioned outside the power conductors such that damage from a single or multiple directions will result in at least one sensor conductor being severed before an energized conductor is exposed.

In other embodiments, the ground conductor may be used as one of the sensor strips. In this configuration, the resistance measuring circuit also detects an open circuit in the ground conductor of the cord. In still other embodiments, one or more sensor strips of a conductive polymer are used for temperature sensing and additional series connected sensor strips of any conductive material are used for mechanical damage sensing.

The plug and connector of two electrical apparatuses may be modified to interconnect the series connected sensor strips of one of the apparatuses in a series relationship to the series connected sensor strips of the second apparatus. In this way, only one of the apparatuses requires a resistance measuring circuit and interrupter. The plug of the second apparatus may contain one or more pins in addition to the conductor prongs and ground pin which connects with one or more pin receptors in the connector to make the connection between the series connected sensors. A sensor strip interrupter in the connector opens the sensor loop within the first apparatus and connects the sensor loop of the second apparatus when the connection is made. This arrangement may be utilized with the ground conductors of the cords as one of the sensor strips to provide a continuous ground continuity sensor. Any reasonable number of electrical apparatuses containing sensor strips may be configured to utilize a single series connected sensor.

The interrupter of the present invention may be connected to a ground fault detector to utilize the advantages of both methods. Overcurrent devices such as heaters may be incorporated into the interrupter to offer multiple safety features in a single device.

Another embodiment is a sheath such as a sleeve or conduit through which a bundle of wires or cables are run. The sheath comprises a sensor strip which performs both the function of sensing overtemperature along the length of the sheath, and mechanical damage as would be caused by cutting, wear or abrasion of the sheath. The purpose of the sheath is to provide a warning or control action upon overtemperature or mechanical damage as sensed by the sensors of the sheath before conductors or insulation of the conductors are damaged. Distributed overtemperature sensing is accomplished by use of sensor utilizing a conductive polymer material having a temperature coefficient of resistivity which increases with temperature. Preferably, the increase in the coefficient of resistivity is of a magnitude so as to produce a "switching temperature" and more preferably a sharp "switching temperature."

The mechanical damage sensing effect accomplished by placement of the mechanical damage sensing portion of the sensor strip in the sheath and in a pattern which will be sensitive to mechanical damage to the sheath. An example of mechanical damage is cutting, abrasion, or fraying resulting from vibration of objects in the vicinity of the sheath. The mechanical damage sensing portion is between the outside surface of the sheath and the bundle of wires or cable. Positioned in this manner, a cutting or abrasive object in contact with the outside surface of the sheath will cut or cause significant damage to the sensor strip, increasing the resistance of the strip and initiating an alarm, trip or control function before the conductors or their insulation is damaged.

In the preferred embodiments, both functions are carried out by the same sensor strip made of the conductive polymer having the positive temperature coefficient of resistivity which increases with temperature. In other embodiments, the distributed overtemperature sensing function is accomplished by one sensor strip made of a conductive polymer having the positive temperature coefficient of resistivity which increases with temperature and a second sensor strip for mechanical damage sensing made of any conductive material such as a metallic wire or strip.

In the preferred embodiments, the sensor strip is wrapped in a helical fashion along the longitudinal axis of the sheath covering the bundle of conductors. In other embodiments, multiple sensor strips parallel to the longitudinal axis are utilized. These multiple strips may be spaced radially with respect to a longitudinal axis of the sheath and shunted to place the individual sensor strips in series to produce a single series connected sensor strip. In still other embodiments, the sensor strip may run in a repeating step, curve or sinusoidal shape along the sheath. Sensor strips may be positioned on the outside, inside or within the wall of the conduit or sleeve. Sensor strips may be coextruded with the conduit. If the sensor strips are disposed on the inside or outside of the conduit, the sensor strips may be applied by hot melt or spray methods.

The sheath may also comprise a longitudinal slit to allow the sheath to be opened and placed over a bundle of wires without passing the entire bundle through an end of the sheath. The sheath, in the form of a sleeve or tube, may be made of a shrinkable material such as shrink tubing. Individual wires or cables may be placed into the sleeve and heat treated to shrink the sleeve over the resulting bundle of wires and cables.

BRIEF DESCRIPTION OF THE DRAWINGS

These and other features, aspects and advantages of the present invention will become better understood with regard to the following description, appended claims and accompanying drawings where:

FIG. 6A is a cross section of an embodiment of an electrical cord with the sensor strips disposed on the inside surface of an outer insulating jacket of the cord.

FIG. 6B is a cross section of an embodiment of an electrical cord with the sensor strips disposed on the outside surface of an outer insulating jacket of the cord.

FIG. 6C is a cross section of an embodiment of an electrical cord with the sensor strips disposed on the inside surface of an outer insulating jacket of the cord, the strips projecting inside the inner surface of the jacket.

FIG. 6D is a cross section of an embodiment of an electrical cord with the sensor strips disposed on the outside surface of an outer insulating jacket of the cord, the strips projecting outside the outer surface of the jacket and an insulated coating over the jacket.

FIG. 6E is a cross section of an embodiment of an electrical cord with the sensor strips disposed in the insulation of the cord, the strips spaced radially about a geometric center of the cross section of the cord.

FIG. 6F is a cross section of an embodiment of an electrical cord with the sensor strips disposed in the insulation of a flat type cord with a center ground conductor.

FIG. 8 is a schematic diagram of two electrical apparatuses protected by a single safety device of the present invention with the connector of the first apparatus comprising a receptor for a pin of the plug of the second apparatus to provide a single series connected sensor.

FIG. 9A is a schematic diagram of two electrical apparatuses protected by a single safety device of the present invention with the connector of the first apparatus comprising a receptor for a pin of the second apparatus to provide a single series connected sensor, the ground conductor of each apparatus incorporated into the series connected sensor.

FIG. 9B is a perspective drawing of the embodiment of FIG. 9A showing the plug with sensor pin and the connector with sensor pin receptor.

FIG. 11A is a graph of the volume resistivity vs. temperature of a sample of filled high density polyethylene.

FIG. 11B is a graph of the temperature coefficient of resistivity vs. temperature of the filled high density polyethylene sample of FIG. 10A.

FIG. 12A is a detail perspective drawing of an end treatment of the wrapped sleeve of FIG. 12 showing the return conductor connection to the sensor and an insulative band installed over the connection.

FIG. 14 is an partial cutaway perspective drawing of a sheath in the form of a conduit with two sensor strips disposed in the wall of the conduit, and a bundle of wires and cable inserted into the conduit.

FIG. 14A is a cross section of the crimp ring for shunting the sensor strips installed on one end of the conduit of FIG. 14.

DESCRIPTION OF THE PREFERRED EMBODIMENTS

The following is a description of the preferred embodiments of an electrical safety device which utilizes a conductive polymer sensor strip to detect an overtemperature condition in an electrical cord, bundle of conductors, or appliance.

Figure 1:
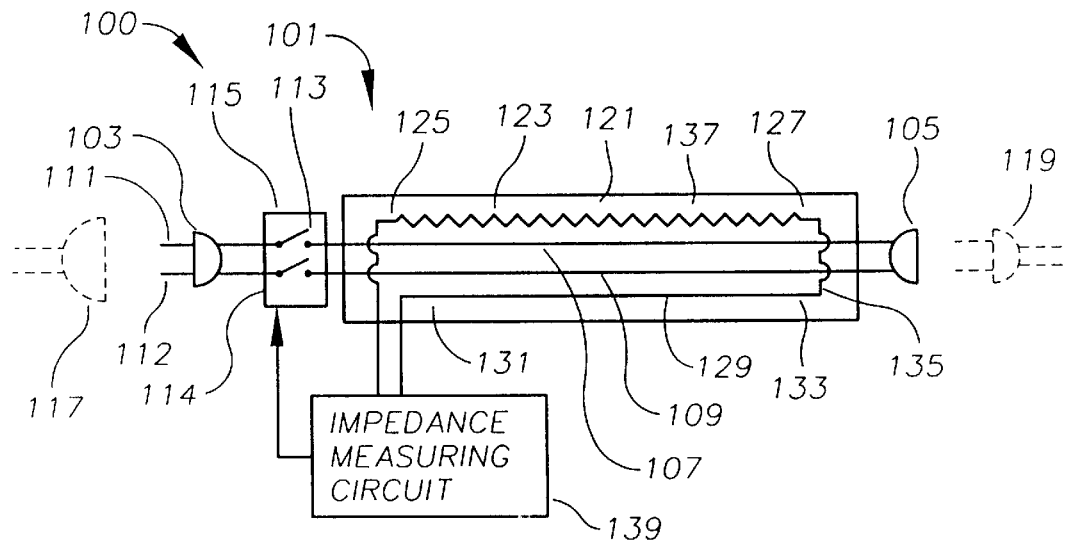
FIG. 1 is a schematic diagram of an extension cord incorporating an embodiment of the electrical safety device, the cord comprising a plug supplying current to a load end, a sensor strip disposed in the insulation of the cord, an impedance measuring circuit for measuring the resistance of the sensor strip, and a relay for interrupting the current to the power conductors of the device.

FIG. 1 is a schematic diagram of an electrical extension cord utilizing embodiment 100 of the electrical safety device for detecting an overtemperature condition in cord 101. Supply plug 103 of cord 101 supplies electrical power to load receptacle or load connector 105 through first conductor 107 and second conductor 109. First prong 111 of plug 103 is connected to first conductor 107 through contact 113 of relay 115. Second prong 112 of plug 103 is connected to second conductor 109 through contact 114 of relay 115. Plug 103 may be inserted into a supply receptacle 117 to supply power to a load 119 from load connector 105. Insulation 121 surrounds first conductor 107 and second conductor 109 between plug 103 and load connector 105.

A first sensor strip 123 disposed in insulation 121 comprises a first end 125 and a second end 127. A second or return strip 129 disposed in insulation 121 comprises a first end 131 and a second end 133. Second end 127 of first sensor strip 123 is connected to second end 133 of second strip 129 by shunt 135 to form a series connected sensor or loop 137. Second strip 129 may be any conductor material. In another embodiment, second strip 129 is a second sensor strip. Series connected sensor 137 is connected to an impedance or resistance measuring circuit 139 at first end 125 of first sensor strip 123 and first end 131 of second strip 129.

Sensor strip 123 is made of a material having a temperature coefficient of resistivity which is positive and increasing with temperature. It has been found that the use of materials having a positive temperature coefficient (PTC) whose value is higher at an elevated temperature as compared to a lower temperature is especially useful in detecting overtemperature conditions over an extended length of a sensor strip. For example, a sensor strip made of a material having a given volume resistivity, a given cross sectional area, and a given length will result in a resistance value measured from end to end. This value of resistance is proportional to the volume resistivity and the length of the sensor strip and inversely proportional to the cross sectional area of the strip. A change in temperature of the strip will result in a resistance change which is proportional to the temperature coefficient of resistivity and the difference in temperature.

If the material has a relatively constant PTC over a specified temperature range, as is the case in many materials such as metals, the resistance change (as measured at the ends of the strip) will behave differently as compared to a material in which the PTC increases with temperature. For example, the resistance of a strip made of a material with a constant PTC will experience the same change in resistance whether all of the strip experiences a given temperature increase or, whether half of the strip length experiences a change in temperature twice the given value. This condition leads to a problem when such a material is used as a linear temperature sensor in that the same resistance change (representing a trip point of the protection device) could be reached by a non-threatening, small temperature increase in the whole strip. Alternatively, the trip point may require an excessively high temperature in the case of a very short fault length.

The strip materials of the present invention utilize a material with a PTC which increases with temperature. These materials, when used in a linear temperature sensor strip, are characterized by an increase in electrical resistance which increases with an increasing rate with temperature. A temperature change in a short length of the sensor strip will result in a change of resistance which is sufficient to trip the circuit before damage occurs. A small temperature change over the length of the cord, which could result from a high ambient temperature or normal current flows through the cord, will not cause a resistance change sufficient to trip the circuit. Because an electrical fault is likely to exist over a very short length of the cord, (for example when several strands of a stranded conductor fail), the material should have a PTC value at least one order of magnitude higher at a temperature approaching the melt or softening temperature of the insulation as compared to normal operating temperatures. In the preferred embodiments, the PTC value of the conductive polymer is 2–12 orders of magnitude greater at the melt or softening temperature of the insulation as compared to normal operating temperatures.

In order to reduce the complexity of the impedance measuring circuit, the volume resistivity of the sensor material is chosen to be less than 10,000 $\Omega$-cm. In the preferred embodiments, the volume resistivity is chosen to be less than 100 $\Omega$-cm.

In the preferred embodiment, the sensor strip material has a PTC which has a relatively low value at operating temperatures and a relatively high value at temperatures which may result in failure of the insulation of the cord, or temperatures which are likely to cause a fire. Certain conductive polymers exhibit such properties and may include both intrinsically conductive polymers and filled polymers. Filled polymers may include thermoplastic and thermoset polymers, copolymers, elastomers and natural or synthetic rubbers. Electrically conducting fillers may include metal particles or fibers such as stainless steel, aluminum, nickel, copper, and silver. Carbon based fillers may also be used. Several polymers and fillers may be combined to optimize the conductivity and "switching effect" of the sensor.

In addition to an increasing PTC with temperature, some of these materials also exhibit mechanical properties which are advantageous to use as a lineal temperature sensor in electrical cords and other apparatuses. Theses properties include good flexibility, high elongation, and good cracking resistance. Some of these materials are extrudable and some are co-extrudable with common insulation polymers such as low and high density polyethylene and polyvinyl chloride. Some of these materials may be used in injection molding, or in co-molding with common polymers used in electrical plugs, receptacles and plugs. Still other conductive polymers may be applied as hot melts, coatings, or inks. These properties lend these materials to optimize the placement of the sensor strip in the cord or apparatus to obtain additional features as discussed in additional embodiments of the present invention.

In operation, an excessive temperature at any point along the length of electrical cord 101 as sensed by first sensor strip 123 results in a high resistance or impedance across series connected sensor 137. Impedance measuring circuit 139 opens relay 115 upon measuring a predetermined impedance of the series connected sensor representing an overtemperature condition in sensor strip 123.

Figure 2:
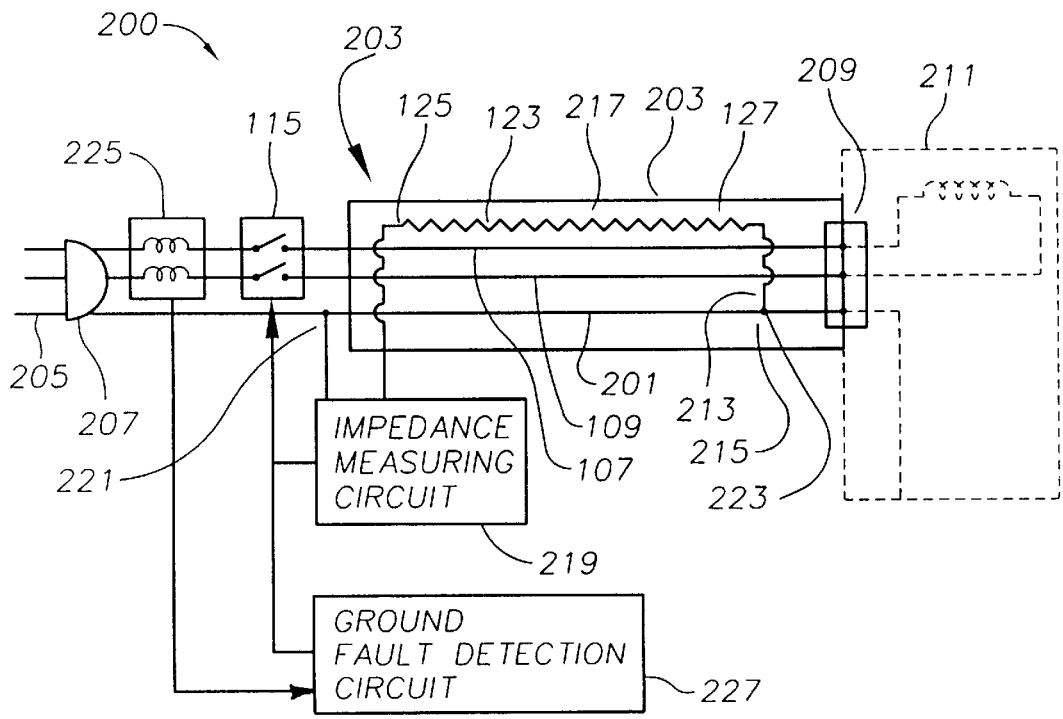
FIG. 2 is a schematic diagram of a power cord for supplying power to a load, the power cord incorporating embodiment 200 of the safety device, the safety device utilizing the ground conductor in a series connected sensor loop, and comprising a ground fault detector and circuitry to interrupt current to the device.

FIG. 2 is a schematic diagram of a power cord 203 utilizing embodiment 200 of the safety device. This embodiment differs from embodiment 100 in that a ground conductor 201 is disposed in cord 203 connecting ground pin 205 of plug 207 to load connector 209. Load connector 209 may be a receptacle or plug connector as in an extension cord, or it may be the internal connections of load device 211. In this embodiment, ground conductor 201 serves as the return or second strip 129 of FIG. 1. Shunt 213 connects second end 127 of first sensor strip 123 to end 215 of ground conductor 201. Shunt 213 forms a series connected sensor 217 from sensor strip 123 and ground conductor 201. The use of ground conductor 201 as the return path of series connected sensor 217 results in impedance measuring circuit 219 serving a second function as a ground wire continuity sensor because an open in ground conductor 201 between connection 221 and shunt connection 223 will result in a high impedance as measured by circuit 219.

Embodiment 200 may also comprise a ground fault transformer or detector 225. A difference in current flow between conductor 107 and 109 as sensed by detector 225 opens relay 115 through ground fault detection circuit 227. In another embodiment, a current detector may be substituted for detector 225. The current detector may be shunt devices such as heaters which trip relay 115 upon overcurrent, or it may comprise a shunt device which opens relay 115 through a controller (not shown). Other overcurrent devices known in the art such as circuit breakers or fuses may be used. Still other embodiments utilize an arc detector substituted for detector 225. The use of multiple detectors as shown in FIG. 2 provides additional safety by providing multiple fault detection and allows use of a single relay 115 to deenergize the apparatus in case of fault.

Relay 115 may be located on the load end of cord 203, or it may be located in load device 211. The preferred location is at source end of cord 203. The return strip of series connected sensor 217 may be external to cord 203. An external return may be used in common ground applications.

Figure 3:
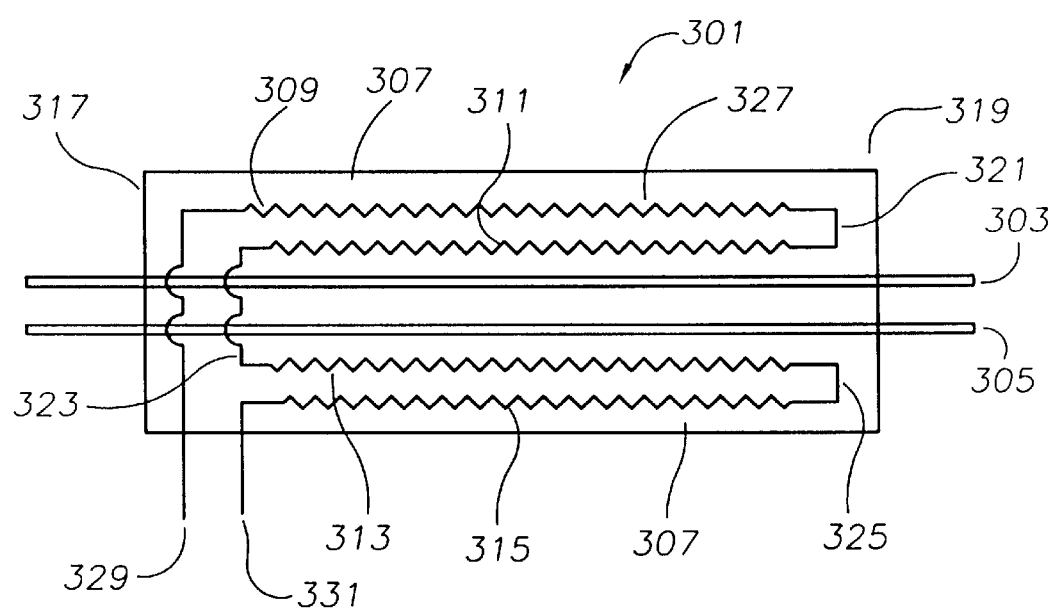
FIG. 3 is a schematic diagram of the cord of another embodiment utilizing four sensor strips and shunts at the supply and load ends to form a series connected sensor loop.

FIG. 3 is a schematic diagram of another embodiment of an electrical cord utilizing the present invention. Cord 301 comprises first conductor 303 and second conductor 305 surrounded by cord insulation 307. First sensor strip 309, second sensor strip 311, third sensor strip 313, and fourth sensor strip 315 are disposed in a length of insulation 307 and extend from a supply end 317 to a load end 319. First shunt 321 connects sensor strips 309 and 311 at load end 319; second shunt 323 connects sensor strips 311 and 313 at supply end 317; and third shunt 325 connects sensor strips 313 and 315 at load end 319. In this way, shunts 321, 323 and 325 connect pair combinations of sensor strips 309, 311, 313, and 315 to form a series connected loop 327 at connections 329 and 331.

Figure 4:
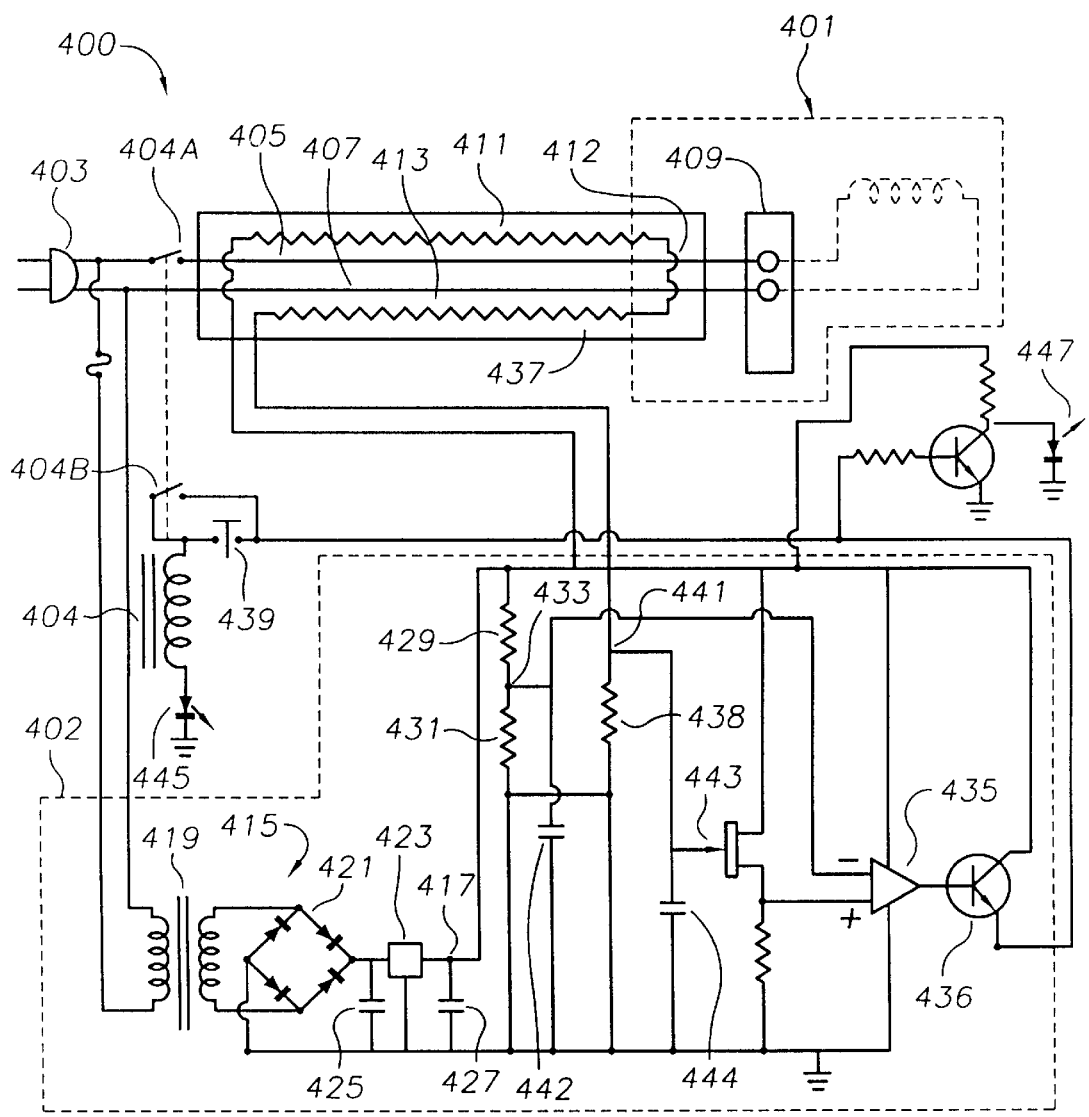
FIG. 4 is an electrical schematic diagram of an embodiment of the electrical safety device showing a power supply, impedance measuring circuit, and fault indicator.

FIG. 4 is an electrical schematic diagram of embodiment 400 of the present invention. Power to load 401 is supplied through plug 403, relay contact 404 A, conductors 405 and 407, and load connector 409. Current is supplied to load 401 through conductors 405 and 407 only when normally open relay contact 404A is closed. Impedance measuring circuit 402 energizes relay 404 during normal operation and de-energizes relay 404 during an overtemperature condition as sensed by sensor strips 411 and 413. Shunt 412 connects the ends of sensor strips 411 and 413 at the load end forming series connected sensor 437.

During normal operation, power supply 415 supplies low voltage dc at power supply connection 417. This operating voltage is obtained from plug 403 through isolation transformer 419, full wave rectifier 421, voltage regulator 423, and filter capacitors 425 and 427. The operating voltage, normally less than 10 VDC, is supplied to a reference voltage divider comprising resistors 429 and 431. The reference voltage at connection 433 is supplied to the (−) input of comparitor 435. A second voltage divider comprises series connected sensor 437 and resistor 438. The sensor voltage of divider connection 441 is connected to the gate of FET 443. FET 443 provides a high impedance buffer to comparitor 435. The output of FET 443 provides the (+) input to comparitor 435. Transistor 436 acts as a driver for relay 404.

Contact 404B provides a latch for relay 404. Momentary switch 439 is used to energize relay 404 after plug 403 is plugged into a supply receptacle.

During normal operation at normal ambient temperatures and load currents, the resistance of series connected sensor 437 is less than a predetermined value. This predetermined resistance value ensures that the voltage at the (+) connection of comparitor 435 is greater than the reference voltage at the (−) connection of comparitor 435. In this state, the output of comparitor 435 is high, turning on transistor 436 and energizing relay 404.

Upon sensing an overtemperature condition, the resistance of series connected sensor loop 437 rises above a predetermined value, resulting in a voltage at divider connection 441 and the corresponding voltage at the (+) connection of comparitor 435 that is sufficiently low to change the state of comparitor 435. The output of comparitor 435 switches low, turning off transistor 436 and de-energizing relay 404. De-energization of relay 404 opens contact 404A, interrupting current flow through conductors 405, 407 and load 401. De-energization of relay 404 also opens contact 404B, unlatching the relay circuit. Relay 404 will remain de-energized even if the fault clears and the resistance of series connected sensor 437 falls below the predetermined value. Momentary switch 439 would have to be momentarily closed in order to re-energize relay 404. This would be done only after an investigation of the fault and the condition of the electrical apparatus.

In other embodiments, a solid state relay or triac and driver circuit (not shown) are substituted for the relay 404. A suitable electronic latching circuit may also be added. Shunt capacitors 442 and 444 shunt induced ac noise to ground.

LED 445 is energized when relay 404 is energized, indicating a "normal" operating mode with power available to load 401. LED 447 is energized when power is available at plug 403, but comparitor 435 is in the "off" condition, indicating a fault as sensed by series connected sensor 437.

The components of impedance measuring circuit 402 are arranged so that failure of the major components will result in relay 404 opening. For example, an open in the power supply 415, FET 443, comparitor 435, driver 436, relay 404, or series connected sensor 437 will result in a "fail safe" mode.

Figure 5A:
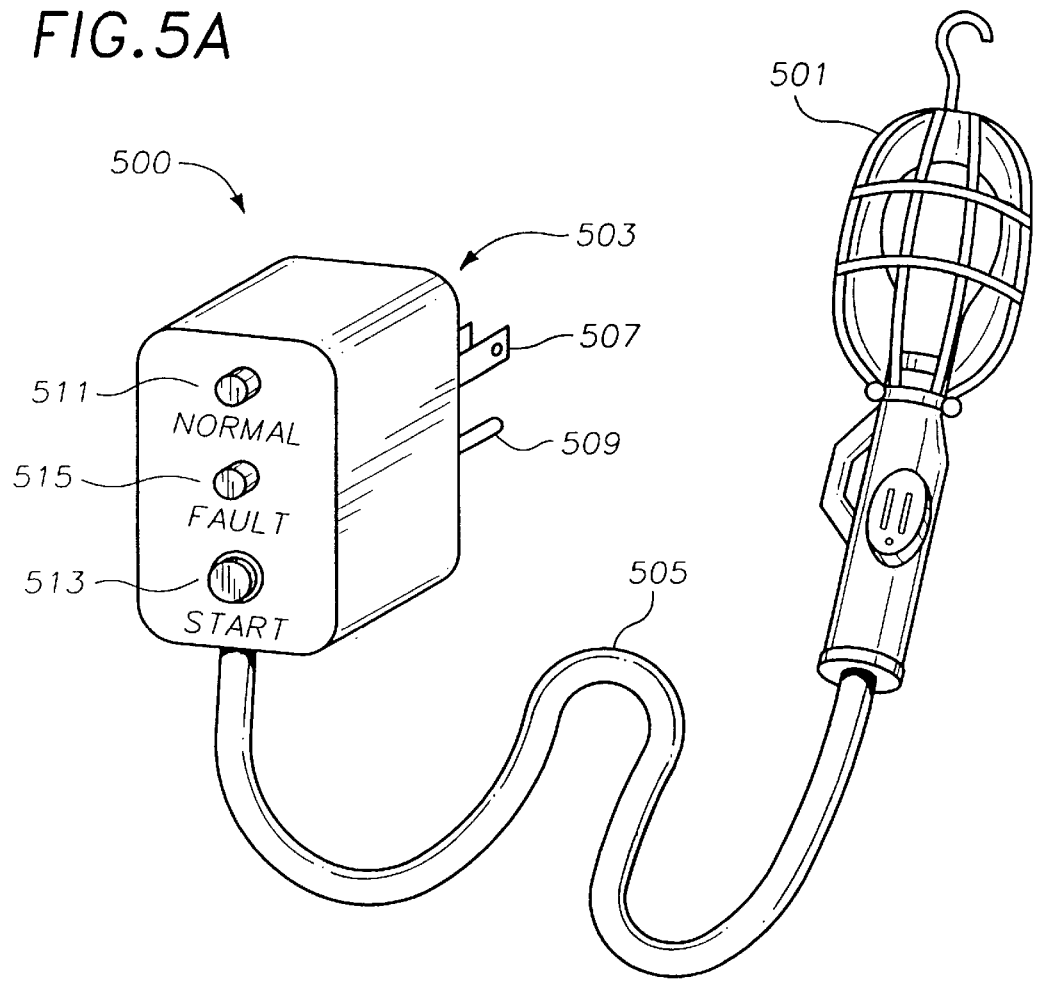
FIG. 5A is a perspective view of an electrical appliance and power cord utilizing an embodiment of the electrical safety device, the safety device comprising a plug-in module containing the impedance measuring circuit and relay.

FIG. 5A is a perspective view of an electrical appliance such as a drop light 501 utilizing embodiment 500 of the present invention. Drop light 501 is connected to a plug-in module 503 by electrical cord 505. In this embodiment, plug-in module 503 comprises standard prongs 507 and ground pin 509 which are inserted into a standard power receptacle (not shown). Module 503 contains impedance measuring circuit 402 and relay 404 of FIG. 4. Power supply 402 is also located in module 503. A "normal" condition indicator 511 indicates that the unit has been plugged in and the "start" switch 513 has been pressed, providing power to drop light 501. Illumination of fault indicator 515 indicates that impedance of series connected sensor (437 of FIG. 4) has increased to a point that indicates an excessive temperature in cord 505, or an open in series connected sensor 437.

Figure 5B:
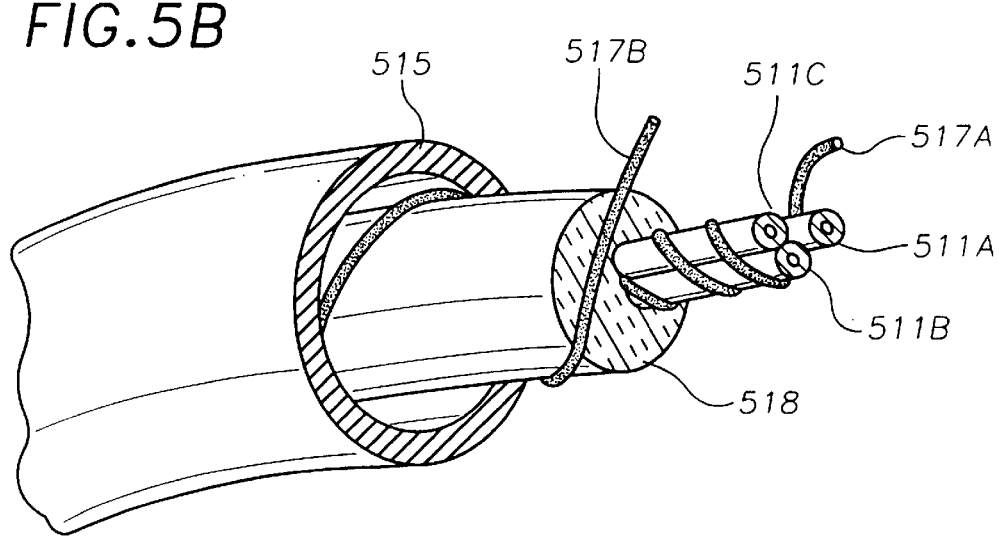
FIG. 5B is a partial fragmentary drawing of the cord of embodiment of FIG. 5A showing two sensor strips disposed inside the cord insulation jacket.

FIG. 5B is a partial fragmentary drawing of electrical cord 505 of FIG. 5A. Insulated conductors for the cord include hot conductor 511A, neutral conductor 511B and ground conductor 511C. Conductors 511A, 511B, And 511C are surrounded by insulated jacket 515. Sensor strip 517A is wound helically around conductors 511A, 511B and 511C. Sensor strip 517B is wound helically around fibrous insulation 518 which surrounds the conductors. Sensor strips 517A and 517B are extruded from a conductive polymer material and are connected by a shunt (not shown) in drop light 501 to form the series connected sensor 437 of FIG. 4. Sensor strip 517B may be wound in a direction opposite of 511A to cancel induced currents from the conductors. In an alternative embodiment, sensor strips 517A and 517B include a co-extruded insulating jacket (not shown) with insulation coaxial with the sensor strip. Insulated in this manner, both sensor strips may be wound outside fibrous insulation 518.

FIGS. 6A–6I are cross sections of power cords representing several methods of dispersing sensor strips in the cords.

FIG. 6A is a cross section of a power cord 600A comprising conductors 601A, 601B and 601C representing several possible combinations of hot, neutral and ground conductors. One or more of the conductors may be covered with insulation 603. All of the conductors are protected by an insulated outer jacket 605 which surrounds the conductors over the length of the power cord. Additional material such as fibrous material 607 may be used for additional insulation or for cord strength.

Sensor strips 609A, 609B, 609C and 609D are disposed in insulated outer jacket 605. In this embodiment, an inside surface 611 of the sensor strips forms part of the inside surface 613 of jacket 605. The sensor strips are spaced radially from the geometric center 602 of the cord cross section. The sensor strips are also spaced radially outward from the conductors. The radial distance from sensor strips 609A, 609B, 609C and 609D to outside surface 606 of insulated jacket 605 is less than the radial distance from conductors 601A, 6011B, and 601C to the outside surface 606 of jacket 605.

This outside spacing of sensor strips relative to the conductors, (especially the hot conductor) promotes a second protective feature of the sensor strips in that a severing or abrasive action from the outside of the cord will likely sever a sensor strip before the severing or abrading object comes into contact with one of the conductors. The sensor strips are made of a conductive polymer material such as a particulate carbon filled polyethylene matrix. The strips may be applied by co-extruding the sensor strips with insulated jacket 605.

FIG. 6B is a cross section of power cord 600B with sensor strips 611A, 611B, 611C and 611D disposed in the outside of insulated jacket 605. An outside surface 615 of the sensor strips forms part of the outside surface 606 of jacket 605. In this embodiment, an outer insulated coating 619 is applied to outside surface 606 of jacket 605 including outside surface 615 of sensor strips 611A, 611B, 611C and 611D. The radial distance from sensor strips 611A, 611B, 611C and 611D to the outside surface 606 of jacket 605 is less than the radial distance from the conductors to the outside surface. Coating 619 insulates the sensor strips from conductive material which could come into contact with the sensor strips such as contaminated water, metal pipes, etc.

FIG. 6C is a cross section of cord 600C similar to the embodiment of power cord 600A where sensor strips 621A, 621B, 621C and 621D are deposited on inside surface 613 of jacket 605 so that the sensor strips extend into the inside area 604 of jacket 605. The sensor strips may be applied by a method such as hot melt is applied.

FIG. 6D is a cross section of cord 600D where sensor strips 623A, 623B, 623C and 623D are deposited on the outside surface 606 of jacket 605. Insulated coating 625 covers and insulates the sensor strips and outer jacket 605.

FIG. 6E is a cross section of power cord 600E in which conductors 627A, 627B and 627C are dispersed in cord insulation 629. Insulation 629 supports and spaces the conductors as well as insulates them. Sensor strips 631A, 631B, 631C, 631D, 631E, 631F, 631G and 631H are dispersed radially about the geometric center 632 of the cross section of insulation 629. The radial distance between the sensor strips and outside surface 633 of cord 600E is less than the radial distance between conductors 627A, 627B and 627C and outside surface 633 of cord 600E.

FIG. 6F is a cross section of flat power cord 600F. Conductors 635A, 635B, and 635C are collinear. Sensor strips 637A, 637B, 637C, 637D, 637E and 637F are dispersed in insulation 639 so that the strips are closer to the nearest outside surface than the "hot" conductor which is protected. A conductor at ground potential (such as 635B in typical cords) does not require such protection.

Figure 6G:
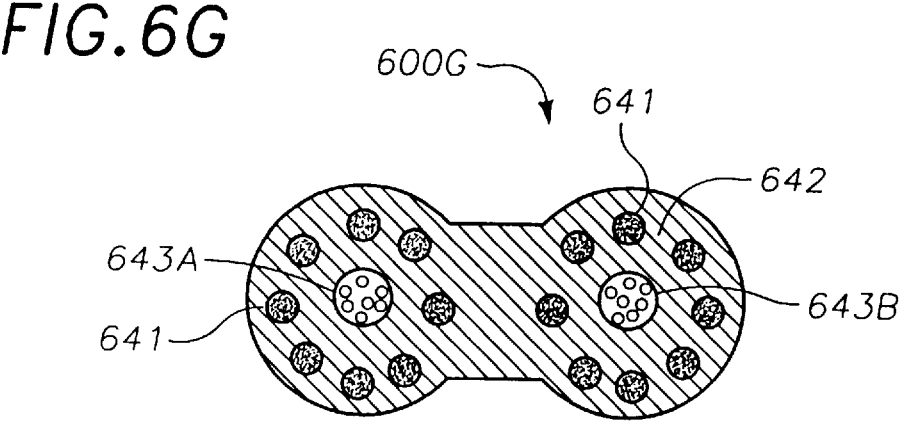
FIG. 6G is a cross section of an embodiment of an electrical cord with the sensor strips disposed in the insulation of a flat type cord with no center ground conductor.

FIG. 6G is a cross section of cord 600G with eight sensor strips 641 disposed in insulation 642 surrounding first conductor 643A and eight sensor strips 641 surrounding second conductor 643B. Sensor strips 641 may be co-extruded with insulation 642 as the cord is formed.

Figure 6H:
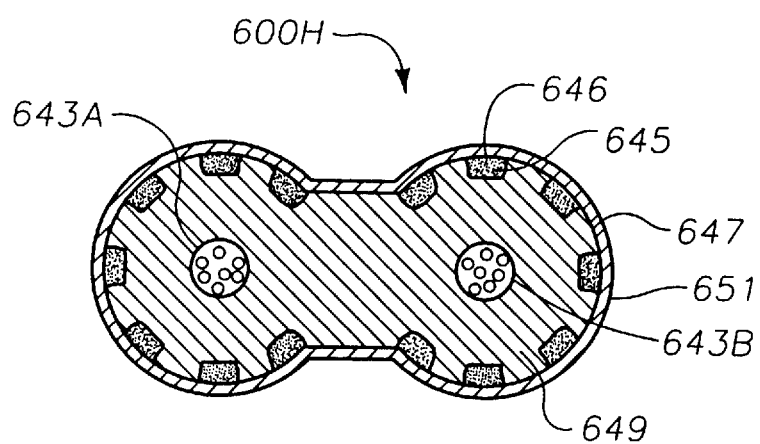
FIG. 6H is a cross section of an embodiment of an electrical cord with the sensor strips disposed on the surface of the insulation of a flat type cord and a insulating coating covering the insulation.

FIG. 6H is a cross section of cord 600H with a plurality of sensor strips 645 extruded with an outside surface 646 of the strips on the outside surface 647 of insulation 649. Coating 651 provides insulation to prevent undesired current paths for sensor strips 645.

Figure 6I:
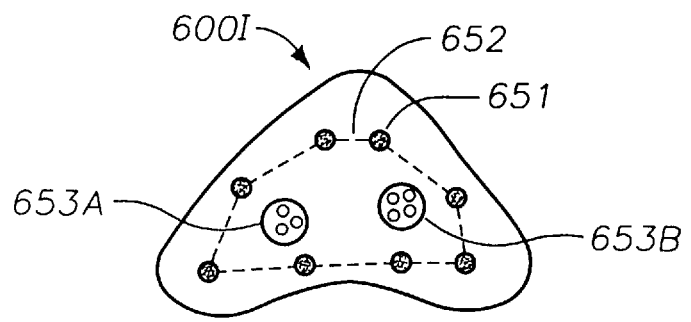
FIG. 6I is a cross section of an embodiment of an electrical cord with the sensor strips disposed so that straight lines connecting adjacent sensor strips are outside the conductors of the cord.

FIG. 6I is a cross section of cord 600I demonstrating a method to disperse sensor strips 651 in cord 600I. Hot conductors 653A and 653B are enclosed by straight lines 652 connecting adjacent sensor strips. In this manner, sensor strips will have a reasonable opportunity to open and deenergize the conductors before an object can contact the hot conductor.

Figure 7A:
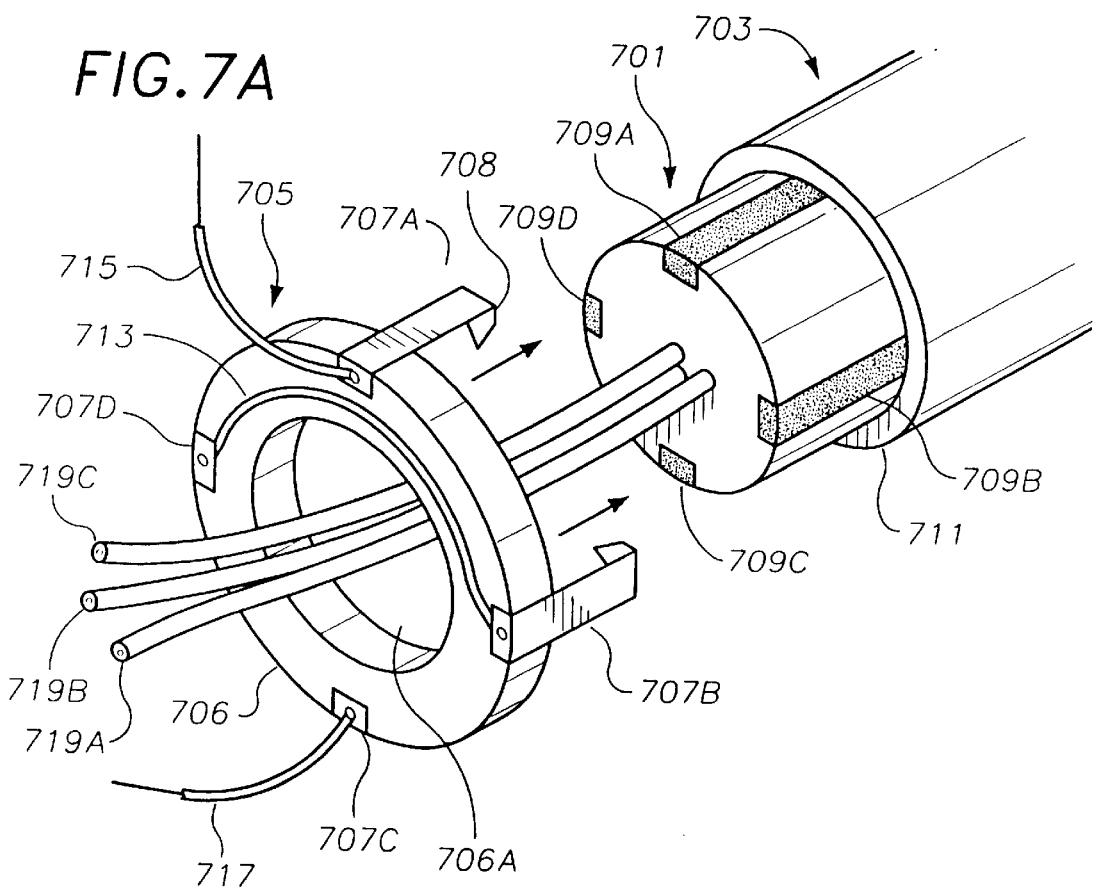
FIG. 7A is a perspective drawing of the plug end of a power cord utilizing a ring type sensor connector with shunt and wire connectors attached to the supply end of the protected power cord.

FIG. 7A is a perspective drawing of the plug end 701 of a power cord 703 with sensor strip connector 705. As ring 706 of sensor strip connector 705 is pressed to end 701, spring contacts 707A, 707B, 707C and 707D spring apart and make a clamping contact with sensor strips 709A, 709B, 709C and 709D. Part of the cord insulation 711 has been stripped to expose the sensor strips over a length sufficient to insert sensor strip connector 705. Penetration tips 708 on each of the spring contacts retains sensor strip connector 705 on cord 703 and aids contact with the sensor strips. In this embodiment, spring contacts 707B and 707D are connected by shunt 713. Wire connection 715, connected to spring contact 707A and wire connection 717, connected to spring contact 707C are connected to an impedance measuring circuit (not shown). Conductors 719A, 719B and 719C pass through aperture 706A of sensor strip connector 705.

Figure 7B:
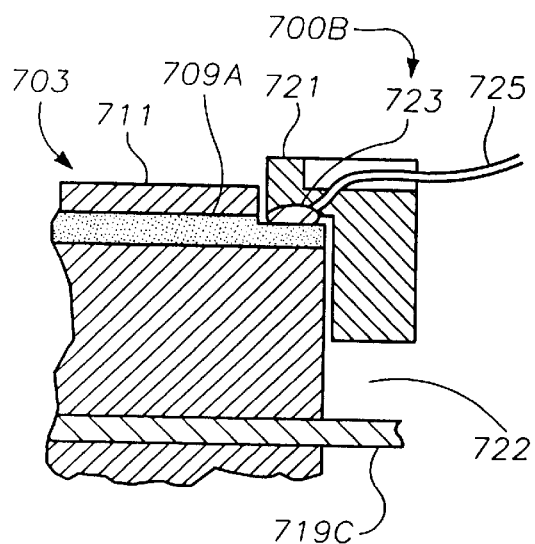
FIG. 7B is a cross section of a sensor strip connector showing an interference fit with the sensor strip end.

FIG. 7B is a cross section of sensor strip connector 700B. Ledge 721 of sensor strip connector 700B makes an interference fit with the trimmed end of cord 703. Sensor strip contact 723 makes an interference fit at sensor strip 709A. Wire connector 725 connects sensor strip contact 723 to the impedance measuring circuit or another element of the series connected sensor (not shown). Insulation 711 is trimmed to allow contact 723 of connector 700B to make contact with sensor strip 709A. Aperture 722 provides clearance for conductor 719C.

Figure 7C:
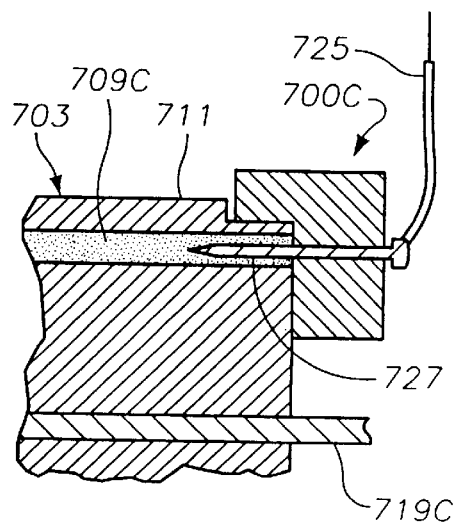
FIG. 7C is a cross section of a sensor strip connector showing an embedded electrode inserted in the sensor strip end.

FIG. 7C is a cross section of sensor strip connector 700C. In this embodiment, connector 700C has an interference fit with the outer insulation 711 of cord end 703. No trimming of cord end 703 is required. Insertion contact 727 pierces the end of sensor strip 709C to make electrical contact with sensor strip 709C. A wire connector 725 connects insertion contact 727 with another element (not shown).

Figure 7D:
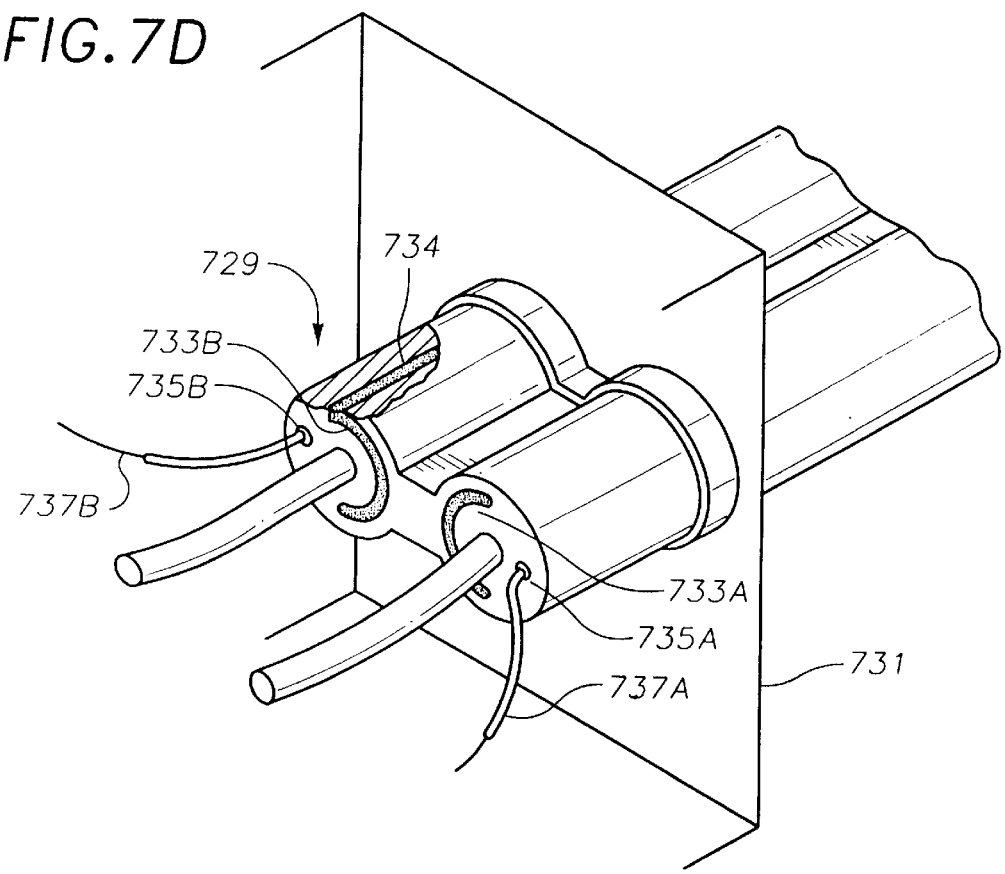
FIG. 7D is a perspective drawing of the sensor strip connections at a supply end of an electrical cord utilizing a conductive polymer material to make the connections with the sensor strip ends.

FIG. 7D is a perspective view and partial cutaway of another embodiment of sensor strip connections. Cord end 729 penetrates module enclosure 731. Conductive polymer shunt 733A connects the ends of a pair of sensor strips (not shown). Conductive polymer shunt 733B connects the ends of sensor strips 734 (shown in cutaway) and a second sensor strip (not shown). Conductive polymer connectors 735A and 735B connect sensor strip ends (not shown) to wire connectors 737A and 737B. Conductive polymer shunts and connectors may be made of the same conductive material used in the sensor strips. For example, the conductive material may be a polyethylene filled with carbon particles. The conductive polymer shunts and connectors may be applied by a welding or hot melt method. In other embodiments, the conductive polymer shunts and connectors may be a polymeric adhesive paste filled with particles such as metal particles to make the connections at the sensor strip ends.

Figure 7E:
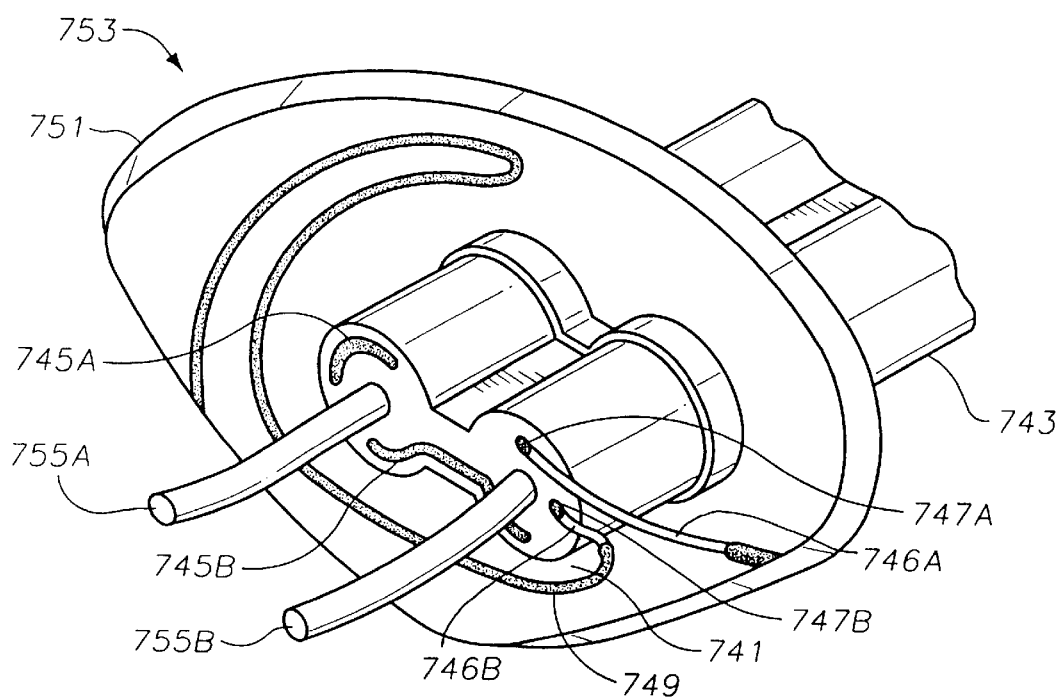
FIG. 7E is a perspective drawing of the sensor strip connections at the load end of a power cord utilizing a conductive polymer material to make connections with the sensor strip ends and a sensor strip disposed on the casing of an electrical appliance.

FIG. 7E is a perspective drawing of sensor strip connections at the load end of a power cord 743. Conductive polymer shunts 745A and 745B connect pairs of sensor strip ends (not shown) as in FIG. 7D. Conductive polymer connectors 747A, and 747B connect sensor strip 749 in series with a pair of cord sensor strips through wire connectors 746A and 746B. Sensor strip 749 is made of a conductive polymer which is applied to the inside of case 751 of load device 753. If case 751 is damaged sufficiently to crack the casing, sensor strip 749 is opened, tripping the power supply to conductors 755A and 755B.

Figure 7F:
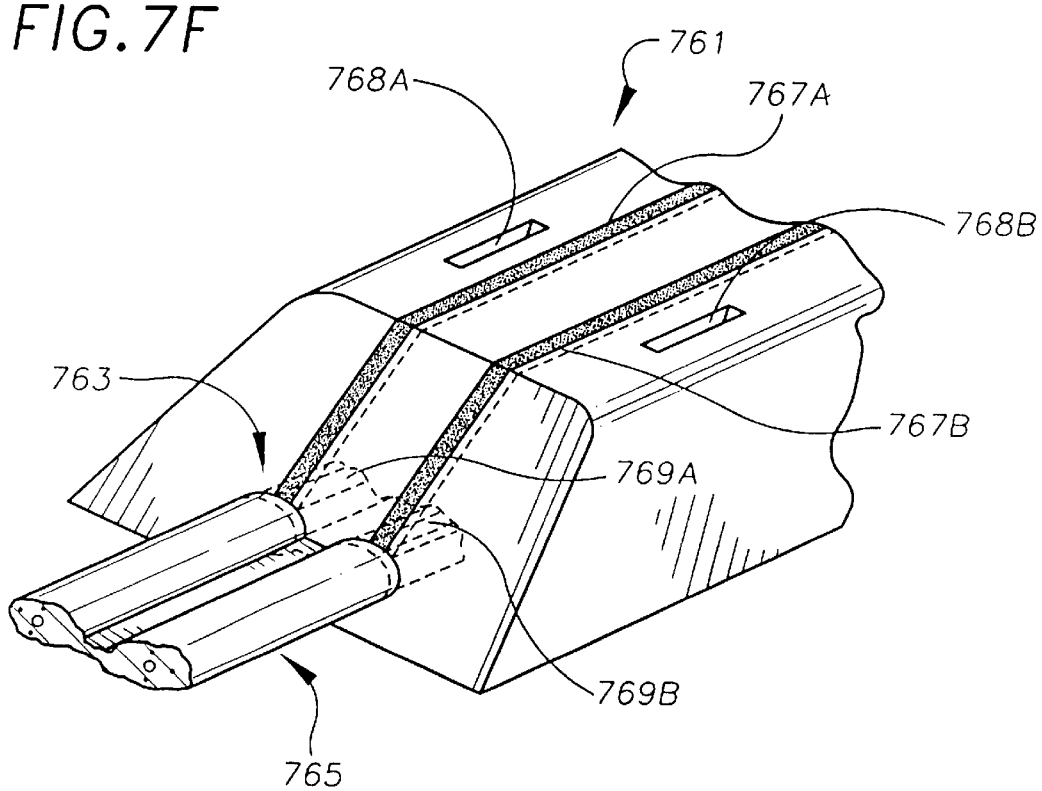
FIG. 7F is a perspective drawing of a female receptacle of an extension cord utilizing conductive polymer strips in a receptacle as supplementary sensor strips and as a shunt for the cord sensor strips.

FIG. 7F is a perspective drawing of female receptacle 761 attached to load end 763 of extension cord 765. Receptacle sensor strips 767A and 767B are connected (not shown) to form a shunt which connects cord sensor strips 769A and 769B. The connections where receptacle sensor strips 767A and 767B meet with cord sensor strips 769A and 769B may be interference fittings, weld connections, or conductive adhesives may be used. A coating (not shown) applied over sensor strips 767A and 767B insulate the strips. Alternatively, sensor strips 767A and 767B are co-molded below the surface of the receptacle.

FIG. 8 is a schematic diagram of embodiment 800 of a second protected electrical apparatus 801 which can be plugged into a first protected electrical apparatus 803. Power to load 805 is provided through prongs 810A and 810B of first plug 808, first conductor 807A and second conductor 807B, prong receptors 812A and 812B of first connector 809, prongs 814A and 81 4B of second plug 811, and conductors 816A and 816B of apparatus 801. Relay 813 interrupts current through first conductor 807A when opened by impedance measuring circuit 815. The series connected sensor for first protected apparatus 803 comprises first sensor strip 819, second sensor strip 821, and shunt 823 comprising armature 825, armature contact 827, and shunt connector 829.

Second protected apparatus 801 comprises a second series connected sensor 830 comprising third sensor strip 831, fourth sensor strip 833, and shunt 835 which may be a sensor strip disposed adjacent to load 805. Body 837 of dual conductor pin 839 is connected to third sensor strip 831 of series connected sensor 830. Tip 841 of dual conductor pin 839 is connected to fourth sensor strip 833 of series connected sensor 830.

When plug 811 of second electrical apparatus 801 is plugged into connector 809 of first electrical apparatus 803, tip 841 of dual conductor pin 839 makes contact with tip contactor 843 of connector 809. Tip 841 also moves tip contactor 843 and armature 825 in the direction of arrow 846, breaking electrical contact between armature 825 and armature contact 827. Body 837 of dual conductor pin 839 makes electrical contact with body contact 845 of connector 809. Plugging second plug 811 into connector 809 thus disconnects first series connected sensor 817 and creates a third series connected sensor comprising first sensor strip 819, third sensor strip 831, shunt 835, fourth sensor strip 833 and second sensor strip 821. An overtemperature condition in either second electrical apparatus 801 or first electrical apparatus 803 will be sensed by impedance measuring circuit 815, disconnecting power to the apparatuses though relay 813.

FIG. 9A is a schematic diagram of embodiment 900 of a second protected electrical apparatus 901 which can be plugged into a first protected electrical apparatus 903. Power to load 905 is provided by prongs 910A and 910B of first plug 908, first conductor 907A and second conductor 907B, prong receptors 912A and 912B of first connector 909, prongs 914A and 914B of second plug 911, and conductors 916A and 916B of apparatus 901. Relay 913 interrupts current through first conductor 907A when opened by impedance measuring circuit 915. Ground contact to load 905 case is provided by ground pin 918 of plug 908, ground conductor 920 of apparatus 903, ground pin receptor 922 of connector 909, ground pin 924 of plug 911, ground conductor 926 of apparatus 901, and load ground conductor 928.

The series connected sensor 906 for first protected apparatus 903 comprises first sensor strip 919, ground conductor 920, and shunt 923 comprising first armature 925, first armature contact 927, and shunt connector 929.

Second protected apparatus 901 comprises a second series connected sensor 930 comprising third sensor strip 931, ground conductor 926, and shunt 935. Pin 939 is connected to third sensor strip 931 of series connected sensor 930.

When plug 911 of second electrical apparatus 901 is plugged into connector 909 of first electrical apparatus 903, pin 939 makes electrical contact with contactor 943 of connector 909. Pin 939 also moves contact 943 and armature 925 in the direction of arrow 960, breaking electrical contact between armature 925 and armature contact 927.

Plugging second plug 911 into connector 909 thus disconnects first series connected sensor 906 and creates a third series connected sensor comprising first sensor strip 919, third sensor strip 931, shunt 935, ground conductor 926 and ground conductor 920 and their associated connectors. An overtemperature condition in either second electrical apparatus 901 or first electrical apparatus 903 will be sensed by impedance measuring circuit 915, disconnecting power to the apparatuses though relay 913.

The series connected sensor of apparatuses 901 and 903 perform three distinct functions. First, an overtemperature condition in either apparatus is sensed by sensor strips disposed in the apparatuses and disconnects power through relay 913. Secondly, mechanical damage which breaks continuity of the series connected sensor trips power through relay 913. Thirdly, the series connected sensor acts as a ground continuity sensor which trips power to the apparatuses through relay 913 if an open occurs in the ground circuit to the load.

FIG. 9B is a perspective drawing of a plug 911 for a second protected apparatus comprising first conductor prong 914A, second conductor prong 914B, ground pin 924, and sensor pin 939. Plug 911 is inserted into receptacle or connector 909 of a first protected apparatus comprising first prong receptor 912A, second prong receptor 912B, ground pin receptor 922, and sensor pin receptor 951. An adapter 953 to adapt the protected plug 911 to a standard grounded receptacle (not shown) comprises prong and pin receptors (similar to 912A, 912B, 922, and 951 of receptacle 909) on end 955 and a first conductor prong 957A, second conductor prong 957B, and ground pin 959. A similar adapter may be utilized for the apparatuses of FIG. 8, deleting the ground pin. In an alternative embodiment, sensor pin 939 is made removeable from plug 911 by a pin and jack arrangement (not shown), allowing plug 911 to be plugged into a standard grounded receptacle.

EXAMPLE 1

Figure 10A:
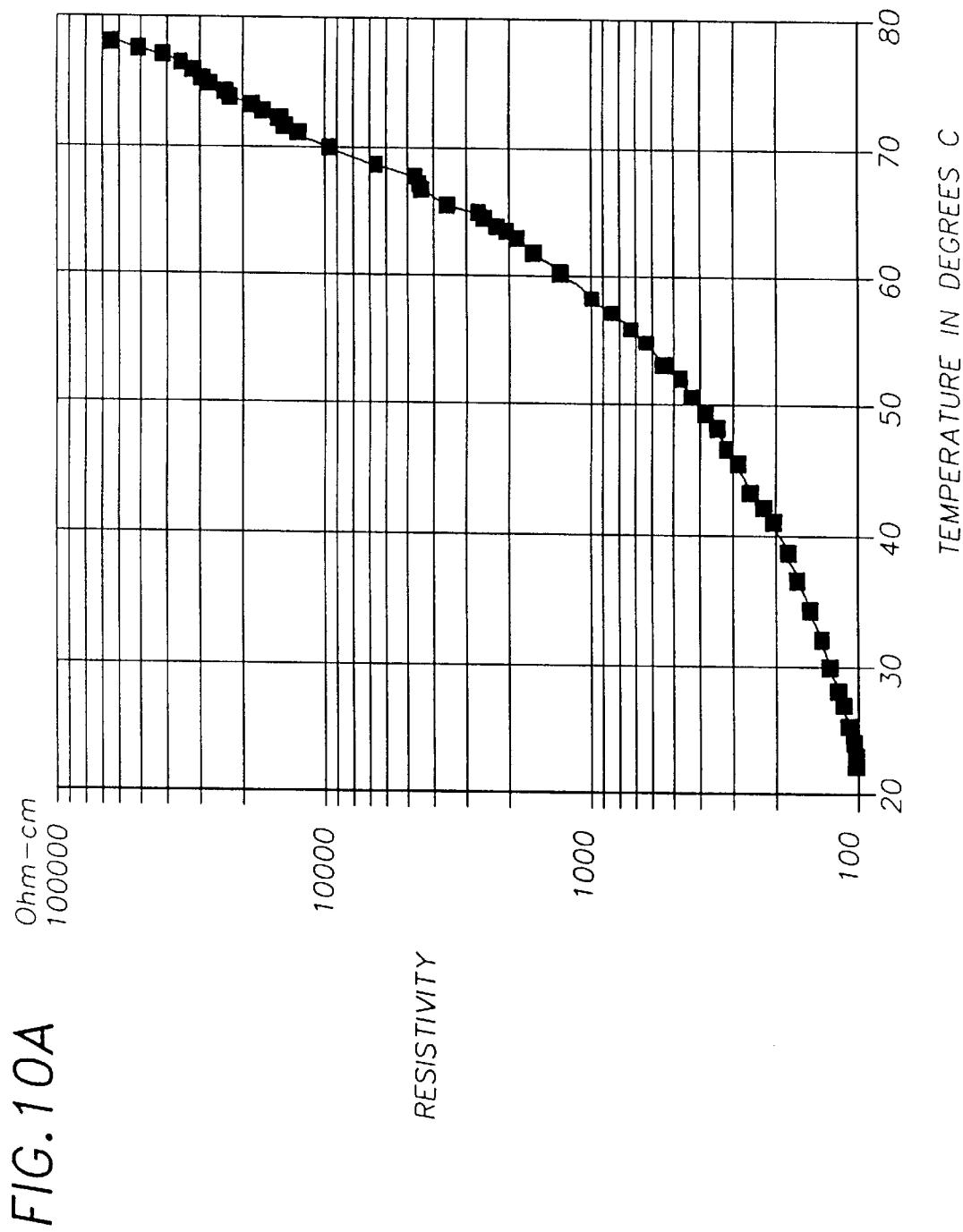
FIG. 10A is a graph of the volume resistivity vs. temperature of a sample of filled low density polyethylene.
Figure 10B:
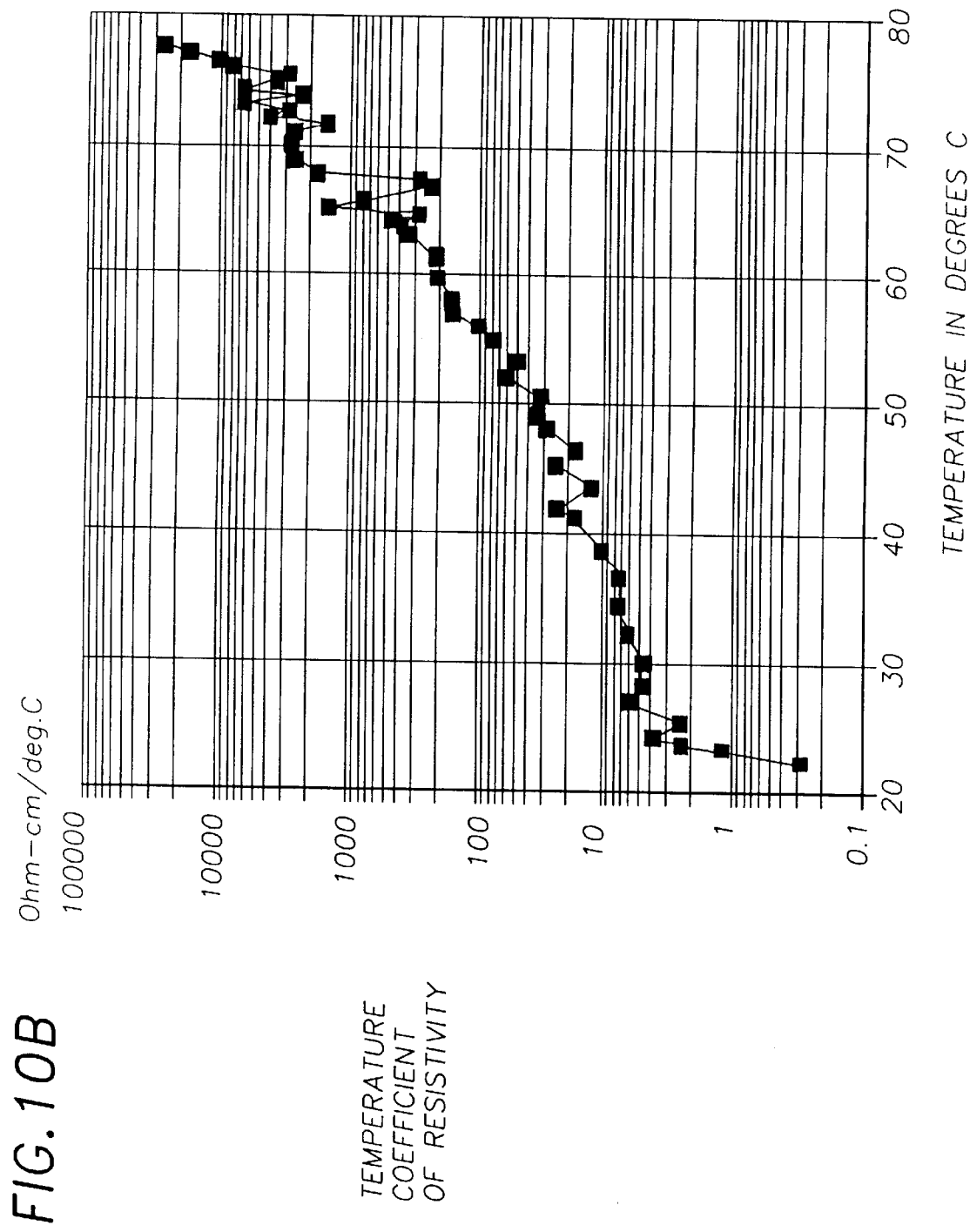
FIG. 10B is a graph of the temperature coefficient of resistivity vs. temperature of the filled low density polyethylene sample of FIG. 10A.

A 0.330 cm wide by 0.152 cm thick by 15.24 cm long test sample was prepared from a commercially available extruded sheet conductive polymer. The conductive polymer was low density polyethylene filled with carbon particles, available under the trade name CONTRIM® LD manufactured by Crystal-X Corporation, Darby, Pa. The resistance was measured end-to-end with test clips and the volume resistivity calculated to be 101 Ω-cm at ambient temperature (22 degrees centigrade). The sample was heated in air and the resistance measured. FIG. 10A shows the resulting plot of volume resistivity vs. temperature. The temperature coefficient of resistivity was calculated from the data by dividing the change in resistivity by the change in temperature for successive readings. The plot of the temperature coefficient of resistivity vs. temperature is shown in FIG. 10B.

EXAMPLE 2

A 0.355 cm wide by 0.154 cm thick by 10.16 cm long test sample was prepared from a commercially available extruded sheet conductive polymer. The conductive polymer was high density polyethylene filled with carbon particles available under the trade name CONTRIM® VF manufactured by Crystal-X Corporation, Darby, Pa.. The resistance was measured end-to-end with test clips and the volume resistivity calculated to be 125 Ω-cm at 27 degrees centigrade. The sample was heated in air and the resistance measured. FIG. 11A shows the resulting plot of volume resistivity vs. temperature. The temperature coefficient of resistivity was calculated from the data by dividing the change in resistivity by the change in temperature for successive readings. The plot of the temperature coefficient of resistivity vs. temperature is shown in FIG. 11B.

Both the low density filled polyethylene and high density filled polyethylene samples exhibited the desired increase in PTC with temperature. The low density polyethylene sample exhibited an increase in PTC of over 4 decades between ambient and maximum test temperature (78 degrees centigrade).

Figure 12:
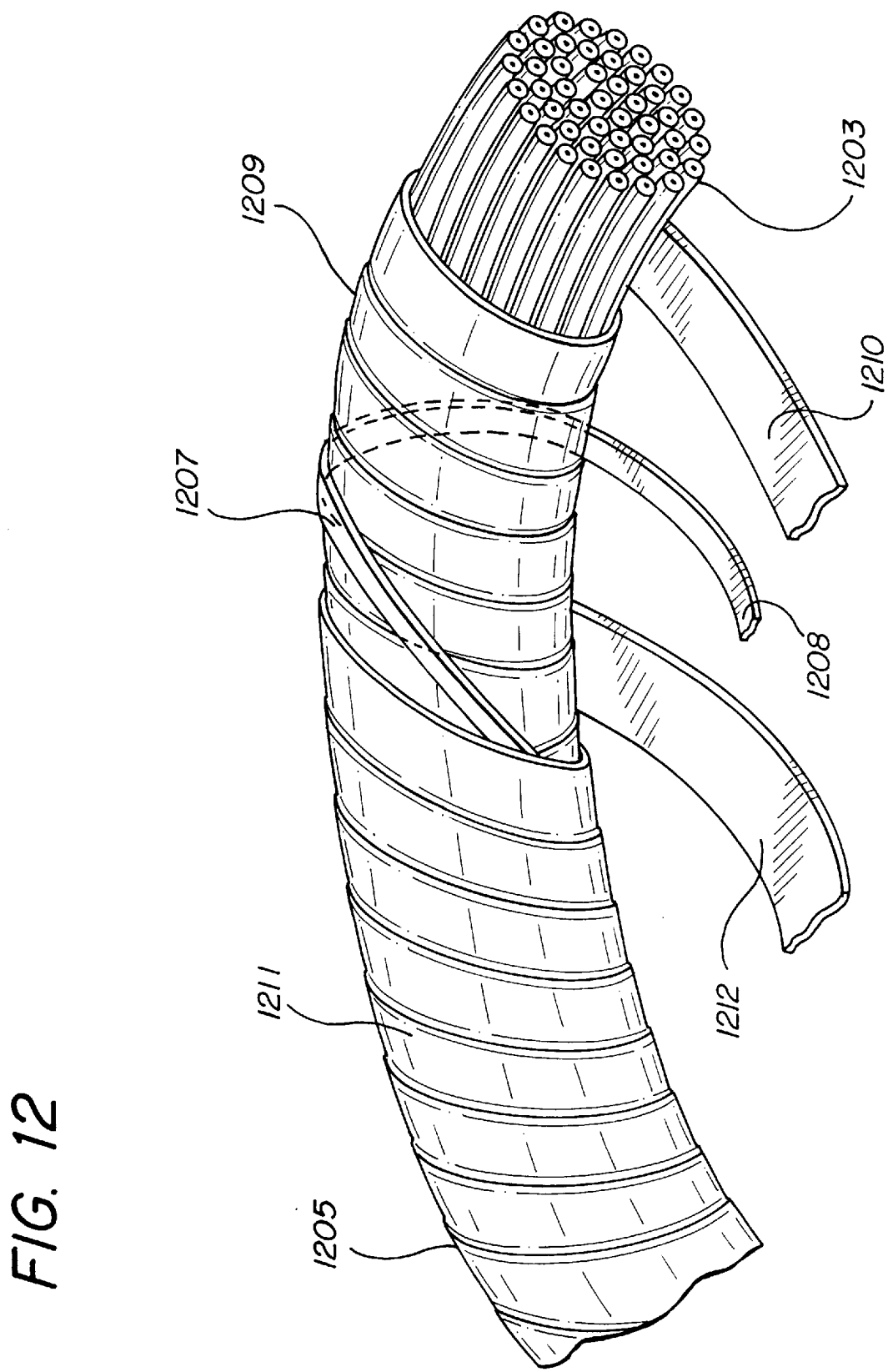
FIG. 12 is a perspective drawing of a wrapped sleeve covering a bundle of insulated conductors with an inner wrap, a conductive polymer sensor wrapped helically about the inner wrap, and an outer wrap covering the sensor.

FIG. 12 is a perspective drawing of yet another embodiment of the present invention showing a wire or conductor bundle 1203 wrapped by a sheath such as wrapped sleeve 1205 comprising a helically wrapped sensor 1207. Sleeve 1205 provides a securing wrap for wire bundle 1203, maintaining a tight, secure wire bundle. Sleeve 1205 also provides mechanical damage protection for the wire bundle from abrasion, cutting or crimping. Sleeve 1205 also provides thermal insulation to wire bundle 1203. In the preferred embodiment, wire bundle 1203 comprises at least two insulated conductors.

In the preferred embodiment, sleeve 1205 comprises an inner wrap 1209 comprising an inner tape 1210 wrapped helically about a longitudinal axis of the wire bundle 1203. Inner film or tape 1210 is made of an insulative material such as polytetrafluoroethylene (PTFE), polyethylene (PE), polypropylene (PP), polyvinyl chloride PVC), laminated, composite or other polymer tapes or films. Inner tape 1210 may also be made of natural fibers such as paper tape, or synthetic fiber and fiber reinforced tapes may be used. In the preferred embodiment, inner tape 1210 is overlapped to provide a continuous layer without gaps. In addition to its insulative and abrasion/cutting protection features, inner wrap 1209 serves to stabilize and secure individual conductors into wire bundle 1203. In other embodiments, multiple tapes similar to inner tape 1210 are wrapped to form inner wrap 1209.

A sensor strip 1208 is wrapped over inner wrap 1209 in a helical pattern to form a mechanical damage/overtemperature sensor 1207. The pitch of sensor 1207 may be varied to account for the resistance properties of the sensor strip material, the dimensions of the sensor strip and sleeve, and the desired protection level of the sensor. A tighter pitch (more wraps per unit length of the wire bundle) provides greater mechanical damage protection because a smaller area of abrasion or cutting damage from the outside (or inside) of sleeve 1205 will result in opening or significant increase in the resistance of the sensor due to loss of cross sectional area of the sensor strip.

In the preferred embodiment, sensor strip 1208 is a tape made from a conductive polymer with a positive temperature coefficient of resistivity which increases with temperature as disclosed, for example in FIGS. 10A–11B. The type of polymer(s), filler type and loading and mechanical/ temperature/chemical/radiation treatments may be selected to provide the desired temperature response for the application. Although sensor strip 1208 is shown in tape form, other configurations such as an extruded wire form may be used. Sensor 1207 is shown in hidden lines behind part of wrap 1209 for clarity.

A helical wrapping of outer tape 1212 forms outer wrap 1211. Outer wrap 1211 forms the outer surface of sleeve 1205 and provides abrasion and cutting damage protection as well as an outer insulative covering for sensor 1207. Outer tape 1212 may be a insulative material such as polytetrafluoroethylene (PTFE), polyethylene (PE), polypropylene (PP), polyvinyl chloride (PVC), laminated, composite or other polymer tapes or films. Outer tape 1212 may also be made of natural fibers such as paper tape, or synthetic fiber and fiber reinforced tapes may be used. In the preferred embodiment, outer tape 1212 is overlapped to provide complete coverage of sensor 1207.

Heat, chemical, or other post-wrap or curing methods may be applied to inner wrap 1209, outer wrap 1211, sensor 1207, or entire sleeve 1205 to seal individual wraps or to provide other desired mechanical properties to sleeve 1205. Heat may be applied to seal weld individual wraps to each other. If heat shrinkable tape is used, heat may be applied to increase wrap tension and provide improved securing of the bundle. In other embodiments, outer wrap 1211 and/or inner wrap 1209 may be omitted from sleeve 1205.

FIG. 12A is a perspective drawing of one embodiment of an end treatment to sleeve 1205. Outer wrap 1211 is discontinued or trimmed at trim area 1215, leaving a portion of sensor strip 1208 exposed. An electrical connection is made to return conductor 1217 at sensor strip end 1219. Lamination of a highly conductive film, metal spray, crimping, clamping, or other connection methods known in the art provide the electrical connection to return conductor 1217. Insulative band 1221 provides coverage and protection to connection 1216. Band 1221 may be made of a heat shrinkable material and heat shrunk over end 1225 of sleeve 1205. In other embodiments, band 1221 is expanded to fit over end 1225 of sleeve 1205 and relaxed in the desired position. In still other embodiments, band 1221 is made of metal with an insulative coating on the outside surfaces (not shown). Such a band may be crimped in the desired position. In still other embodiments, band 1221 provides a clamping force to provide an electrical connection between sensor strip 1208 and return conductor 1217. In still other embodiments, the return path for sensor 1207 may be routed to a common or ground connection.

Figure 13:
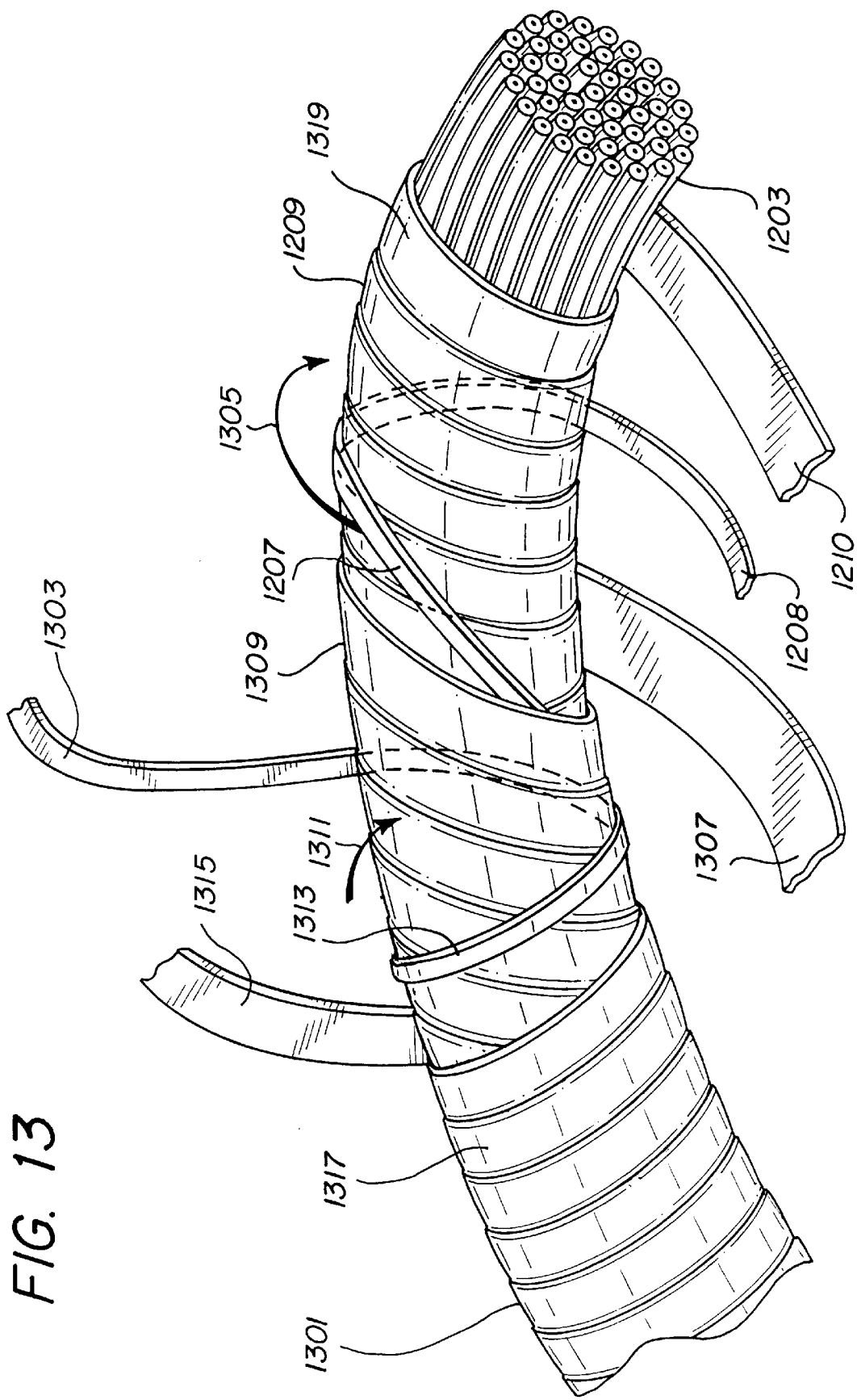
FIG. 13 is a perspective drawing of an embodiment of a wrapped sleeve incorporating two sensors made by wrapping a first sensor strip in the form of a tape over the inner wrap and a second sensor strip in the form of a tape wrapped over an intermediate wrap.

FIG. 13 is a perspective drawing of a wrapped sleeve 1301 over wire bundle 1203 utilizing two wrapped layers of sensor strip 1208, 1303. Inner tape 1210 is wrapped helically about wire bundle 1203 to form inner wrap 1209 as in the embodiment of FIG. 12. Sensor strip 1208, wrapped helically in direction 1305 provides sensor 1207. Intermediate tape 1307, wrapped helically over sensor 1207 provides an insulative intermediate layer 1309 between sensors. Sensor strip 1303, wrapped helically over intermediate layer 1309 in direction 1311 provides sensor 1313. Outer tape 1315, wrapped helically over sensor 1313 provides an insulative and mechanically protective outer layer 1317 of sleeve 1301.

Two sensors 1207 and 1313 provide additional mechanical damage sensing and overtemperature sensing capabilities as compared to the embodiment of FIG. 12. For example, the two direction winding of the sensor tapes makes it more difficult for an external abrading or cutting condition to progress to wires of bundle 1203 without damaging or opening one of the sensor strips.

End connection of sensor strips 1208 and 1303 at end 1319 of sleeve 1301 is done in a similar manner to FIG. 12A, except that respective ends of sensor strips 1208 and 1303 are electrically connected together under band 1221 of FIG. 12A. No return conductor is needed because sensors 1207 and 1313 form a series connected loop. The free ends of sensors 1207 and 1313 at the opposite end of sleeve 1301 (not shown) are electrically connected to an indicating, alarm or control device. In this manner, the sensor strip connection would act as a shunt connecting the pair of sensor strips. Other forms of shunts for one or more pairs of sensor strips may be used, for example, end caps or wire type shunts.

In other embodiments, sensors 1207 and 1313 are formed by two wrappings of a single length of sensor strip. In this embodiment, after intermediate tape 1307 is wrapped over sensor 1207 as in FIG. 13, sensor strip 1208 is wrapped back toward the end opposite from end 1319 to form sensor 1313. In one embodiment, the two helical wraps of sensor strip are wrapped in opposite directions, resulting in a "crossing" helical pattern of the two insulated sensors. This "crossing" pattern provides additional mechanical damage sensing not realized in same direction windings. Outer layer 1317 is formed as shown in the figure. In this embodiment, sensor strip 1303 and the end connection at end 1319 are not required. For wire bundles having individual conductor or partial bundle branching from the main bundle, one or more sensor strips may be wrapped around the branch conductor (s) and back in a continuous fashion, similar to sensor strip 1513 of FIG. 15, for a desired length. Inner wrap, outer wrap, and intermediate wrap may be done in a similar manner.

FIG. 14 shows a partial cutaway perspective drawing of another embodiment of a overtemperature and mechanical damage sheath for wire and cable in the form of conduit 1401. Conduit 1401 forms a protected pathway for wire 1403 and multi-wire cable 1405. In the preferred embodiment, conduit 1401 comprises two or more sensor strips 1407 and 1409 embedded in the insulative layer or wall 1411 of conduit 1401. At least one sensor strip is made of a conductive polymer with a positive temperature coefficient of resistivity which increases with temperature, for example, as shown in FIGS. 11B. In the preferred embodiment, sensor strips 1407 and 1409 are coextruded in the wall of conduit 1401 during manufacture. Conduit 1401 may be flexible plymeric material such as an natural or synthetic rubber; or conduit 1401 may be rigid conduit made of a rigid polymer such as polyvinylchloride or of a ceramic material.

Connection 1413 provides an electrical connection between sensor strip 1407 and connector wire 1415. Connection 1417 provides an electrical connection between sensor strip 1409 and connector wire 1419. Connections 1413 and 1417 may be made by conductive adhesives, wire insertion, or other connection methods with conductive polymers known in the art. The opposite ends of sensor strips 1407 and 1409 are shunted or connected at end 1421 by crimp ring 1423. A portion of insulative wall 1411 is removed in the location where ring 1423 will be located, exposing sensor strips 1407 and 1409. Ring 1423, crimped around the trimmed portion at end 1421, makes electrical contact between sensor strips 1407 and 1409 to form a series connected loop with sensors 1407 and 1409. Connector wires 1415 and 1419 are connected to alarm, indication or control circuitry.

FIG. 14A shows a cross section of conduit 1401 taken along lines 14A–14A of FIG. 14. Crimping ring 1423 is crimped on the trimmed portion 1425 of conduit 1401, making mechanical and electrical contact with sensor strips 1407 and 1409. Crimping ring 1423 is made of a conductive material such as a conductive metal and insulated on the outside surfaces by insulation coating 1427. Other electrical connection means may be used to connect sensor strips 1407 and 1409 such as a shunt wire.

Figure 14B:
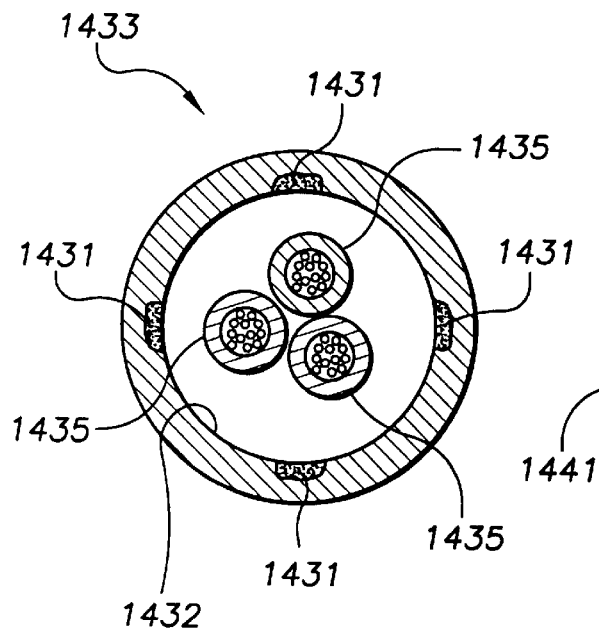
FIG. 14B is a cross section of an embodiment of a conduit protecting a bundle of insulated conductors, the conduit comprising four sensor strips with one surface of the sensor strips forming part of the inside surface of the conduit.
Figure 14C:
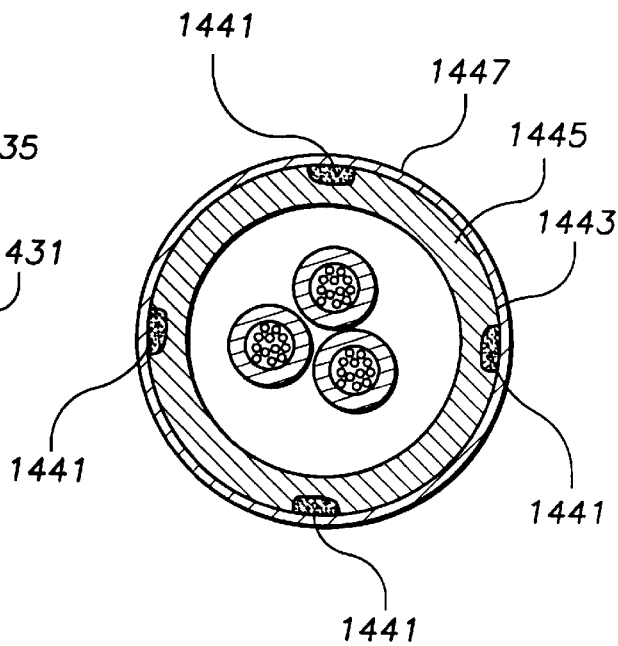
FIG. 14C is a cross section of an embodiment of a conduit protecting a bundle of insulated conductors, the conduit inner portion comprising four sensor strips with one surface of the sensor strips forming part of the outside surface of the conduit inner portion, and an outer insulative coating over the conduit inner portion and sensor strips.

FIGS. 14B–14E show cross sections of additional embodiments of sensor strips disposed in conduits for wire or cable. The sensor strips are spaced radially about a longitudinal axis of the conduit. FIG. 14B utilizes four sensor strips 1431 disposed in the wall of the conduit with one surface of sensor strip 1441 forming part of the inside surface 1432 of conduit 1433. Sensor strips 1431 provide mechanical damage and overtemperature sensing for enclosed conductors 1435. FIG. 14C is a cross section of an embodiment where sensor strips 1441 are disposed in conduit inner portion 1445 with a portion of sensor strips 1441 forming a portion of the outside surface 1443 of conduit inner portion 1445. An insulative coating 1447 is applied over the outside surface 1443 of inner portion 1445 and sensor strips 1441, for example by spraying, dipping, or extruding. Coating 1447 provides electrical insulation and mechanical protection for sensor strips 1441.

Figure 14D:
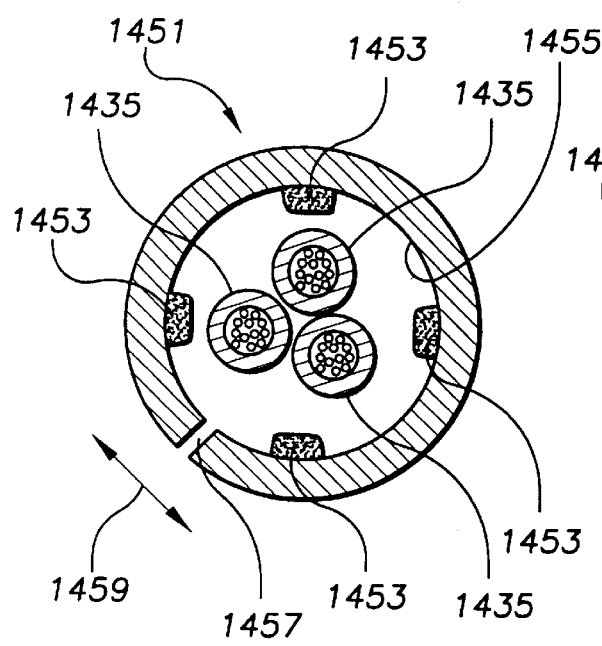
FIG. 14D is a cross section of an embodiment of a conduit protecting a bundle of insulated conductors, the conduit comprising four sensor strips deposited on the inside surface of the conduit, and the conduit having a slit to allow placing over the bundle of wires without inserting through an end of the conduit.
Figure 14E:
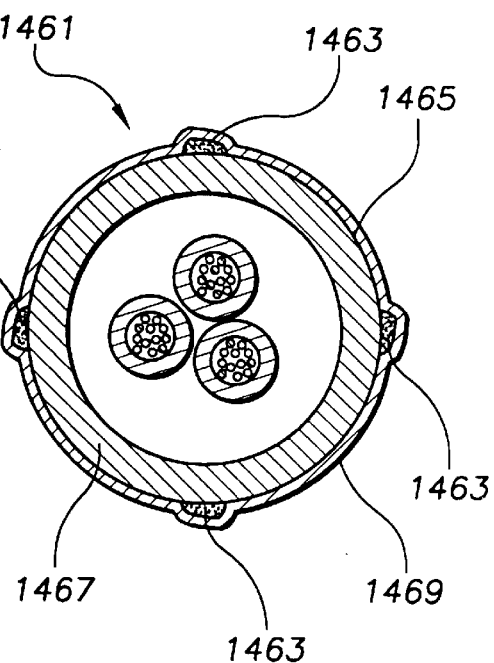
FIG. 14E is a cross section of an embodiment of a conduit protecting a bundle of insulated conductors, the conduit comprising four sensor strips deposited on the outside surface of the conduit inner portion and an insulative coating over the outside of the conduit inner portion and sensor strips.

FIG. 14D is an embodiment showing a conduit 1451 comprising four sensor strips 1453 deposited on the inside surface 1455 of conduit 1451. Sensor strips 1453 may be deposited on the inside surface 1455 by a hot melt nozzle, for example. FIG. 14E shows conduit 1461 comprising sensor strips 1463 deposited on outside surface 1465 of conduit inner portion 1467. Insulative coating 1469 is applied over sensor strips 1463 and outside surface 1465. Sensor strips 1463 may be applied to the outside surface 1465 of inner portion 1467 by a hot melt nozzle prior to applying coating 1469.

Sensor strips of FIGS. 14B–14D may be disposed helically with respect to the longitudinal axis such as the centerline of the conduits as in FIG. 14, or they may be disposed parallel to the longitudinal axis of the conduits similar to the sensor strips of FIG. 7A. In still other embodiments, sensor strips may be disposed in a sinusoidal, stepped or similar pattern along the conduit.

The conduits may comprise a slit such as slit 1457 of conduit 1451 shown in FIG. 14D. Slit 1457 allows conduit 1451 to be extended open in the direction of arrow 1459 to install the conduit over one or more conductors 1435 and then relaxing conduit 1451. This feature allows conduit 1451 to be installed over conductors 1435 without inserting the conductors through an end of the conduit. Conductors may be routed through one or both ends of the conduit singly, or as a bundle if no slit is utilized.

Figure 15:
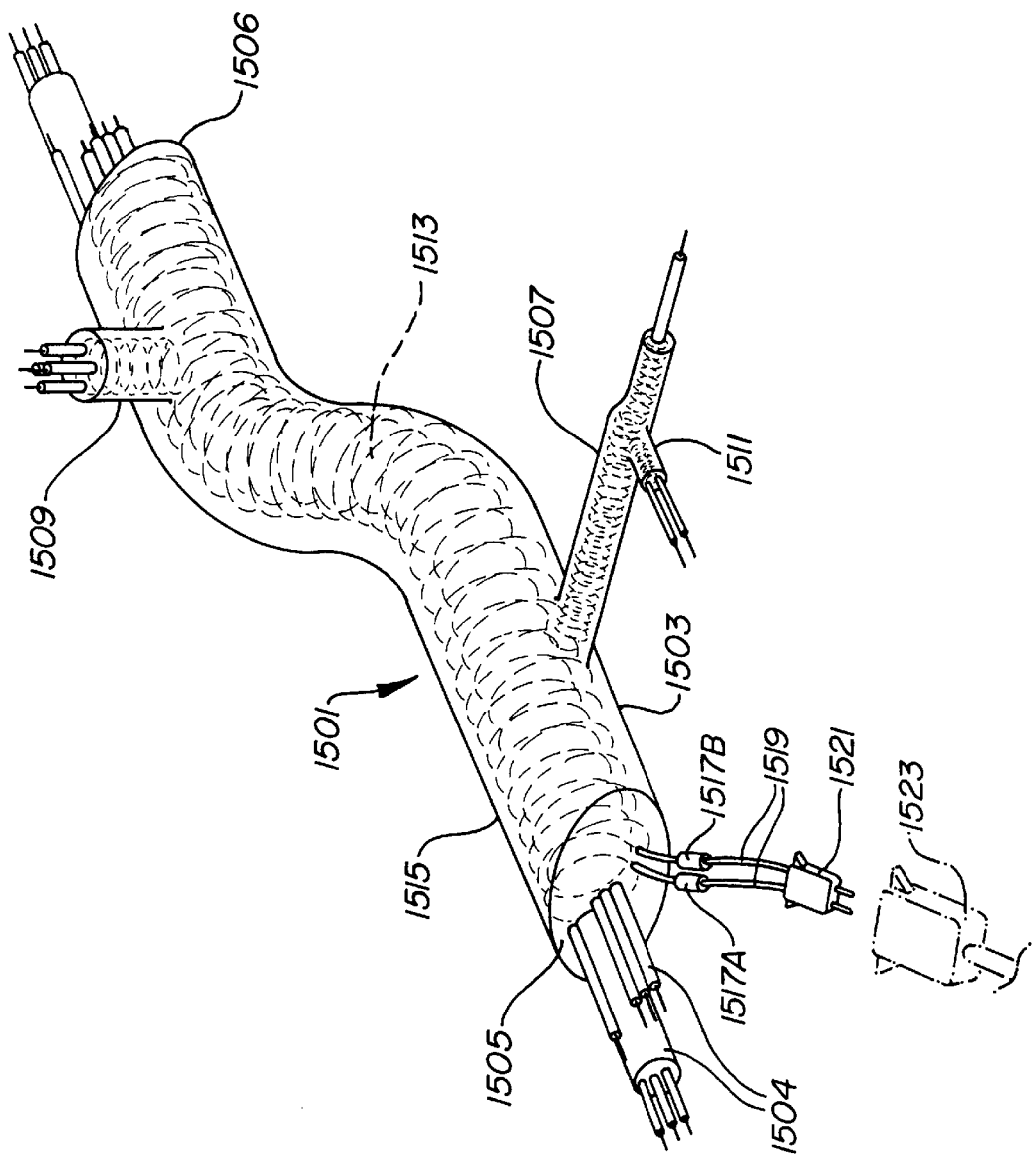
FIG. 15 is a perspective drawing of a molded conduit or harness assembly comprising a molded body molded or cast around a pre-formed bundle of wires and cables, the molded body having a plurality of distributor portions projecting from a feed end portion and comprising a continuous sensor strip wrapped around the bundle and extending through the molded body.

FIG. 15 shows a sheath for conductors in the form of a molded conduit embodiment 1501 comprising an insulative molded body 1503 molded around and surrounding a bundle of wires, cables, or other conductors 1504. Molded body 1503 comprises a supply or feed end 1505 and a main distributor end 1506. In the preferred embodiment, multiple distributors such as distributor 1507 and 1509 branch off molded body 1503. Distributors may further branch off into sub-distributors 1511.

A sensor strip 1513, shown in hidden lines, is disposed in the molded body between the bundled conductors, omitted for clarity, and the outside surface 1515 of the molded body. Disposed in this way, sensor strip 1513 will be opened or damaged by an object causing abrasion or cutting of the conduit body before the conductors are damaged or become exposed by the offending object. In the preferred embodiment, sensor strip 1513 is a continuous strip helically wound around the conductors from connection 1517A at feed end 1505 to main distributor end 1506 and returned to connection 1517B at feed end 1505. In other embodiments, sensor strip 1513 is also helically wound around conductors in branch distributors such as distributor 1507 and sub-distributor 1511. In this way sensor strip 1513 provides overtemperature and mechanical damage sensing for all conductors in all distributors of the conduit. Connection wires 1519 make electrical connections between sensor strip 1513 at connections 1517A and 1517B and plug 1521. Plug 1521 provides a quick and convenient method to connect to electrical socket 1523 for connection to alarm or control circuitry.

Molded conduit may be made by preparing a preformed bundle of conductors. The conductors, cut to length and formed to the desired shape are wrapped by the sensor wire or tape in a helical pattern. The wrapped bundle is then placed in a prepared mold having the general shape of the wrapped bundle, with the sensor strip ends at the feed end of the conduit. The molded body is then molded or cast in methods known in the art. The body material may be thermoplastics, thermosets, elastomers or composites. The body material should be an electrical insulative material and comprise a melt temperature less than the sensor wire or conductor insulation. In other embodiments, the mold body material is two-part epoxies which are cold cast.

In the preferred embodiments of sheaths, the sensor strip is disposed over the length of the sleeve for which mechanical damage and overtemperature sensing is desired. In the preferred embodiments, the sensor strip is also wrapped over a substantial length of the bundle of conductors. For the purposes of this disclose, a substantial length is defined by at least one of the following: the full length of the bundle of conductors; the fall length of the bundle less a working length on each end necessary for conductor insulation trimming and termination; the length between ends and branches of the bundle less the working length; the length between branches of the bundle less the working length; or the length of the bundle in which a significant overtemperature or mechanical damage (or both) hazard exists.

In the more preferred embodiments, the sensor strip is disposed over a length of at least 10 percent of the length of the sleeve. In an even more preferred embodiment, the sensor strip is wrapped over a length of at least 25 percent of the length of the sleeve. And, in the most preferred embodiment, the sensor strip is wrapped over a length of at least 50 percent of the length of the sleeve. In the preferred embodiments, the inner and outer wraps also extend a substantial length of the bundle, although not necessarily the same length as the sensor strip or each other. Bundle length may be defined as the longest multiple conductor length if no conductors are branched from the sheath portion of the bundle. Bundle length may be defined as the length of the longest unbranched portion if conductors are branched from the sheath.

For helically wrapped sensors, mechanical damage sensing is improved with a tight pitch (more turns per unit length) because more turns per unit length increases the probability that the sensor strip will be opened or severely damaged when a smaller outside surface area is mechanically damaged. In the preferred embodiments, at least one turn of the sensor strip is made for each sleeve length of 20 diameters. In the more preferred embodiments, at least one turn of the sensor strip is made for each sleeve length of 10 diameters. In the even more preferred embodiments, at least one turn of the sensor strip is made for each sleeve length of 5 diameters. In the most preferred embodiments, at least one turn of the sensor strip is made for each sleeve length of 2 diameters.

For sheaths utilizing multiple longitudinal sensors, the preferred embodiments utilize at least two sensor strips spaced radially about a longitudinal axis or centerline of the sheath. The more preferred embodiments utilize at least four sensor strips spaced radially about a longitudinal axis or centerline of the sheath. The even more preferred embodiments utilize at least six sensor strips spaced radially about a longitudinal axis or centerline of the sheath. And the most preferred embodiments utilize at least eight sensor strips spaced radially about a longitudinal axis or centerline of the sheath.

Accordingly the reader will see that the ELECTRICAL SAFETY DEVICE WITH CONDUCTIVE POLYMER SENSOR provides overtemperature protection and mechanical damage protection for electrical conductors and devices not previously available. The device provides the following additional advantages:

The device provides an alarm or interrupts power to an electrical conductor or electrical appliance upon an overtemperature condition at any portion along the length of the electrical conductor or desired surface area of the appliance;

The device provides an alarm or interrupts power to an electrical conductor or electrical appliance upon mechanical damage which could expose energized conductors at any portion along the length of the electrical conductor or desired surface area of the appliance;

A single sheath, conduit or sleeve may protect a large number of electrical conductors;

The sheath, conduit or sleeve may be installed easily and quickly; and

The device may be easily combined with overcurrent, arc sensing and ground fault protection.

Although the description above contains many specifications, these should not be construed as limiting the scope of the invention but as merely providing illustrations of some of the presently preferred embodiments of this invention. For example, overtemperature and mechanical damage sensing sleeves may protect optical, infra red, or other electromagnetic communication cables. The insulative layer of a sheath may be the insulation of a conducive polymer sensor strip insulated as an insulated wire and wrapped about a bundle of conductors. Thus the scope of the invention should be determined by the appended claims and their legal equivalents, rather than by the examples given.

We claim:

1. A sheath for providing overtemperature and mechanical damage sensing for a of electrical conductors, the sheath comprising:

a layer of insulative material positionable to substantially surround said plurality of electrical conductors; and at least one sensor strip in communication with the layer of insulative material and made of a conductive polymer material comprising a positive temperature coefficient of resistivity which increases with temperature, said at least one sensor strip extending a length of said plurality of electrical conductors and disposed between an outside surface of the sheath and said plurality of electrical conductors so that mechanical damage originating on the outside surface will result in mechanical damage to said at least one sensor strip before mechanical damage is sustained to said plurality of electrical conductors.

2. The sheath of claim 1 wherein the positive temperature coefficient of resistivity increases at a rate with temperature so as to result in a switching temperature.

3. The sheath of claim 2 wherein said at least one sensor strip is disposed in a helical pattern with respect to a longitudinal axis of the sheath.

4. The sheath of claim 2 wherein the layer of insulative material comprises a conduit and the sensor strip is disposed on an inside surface of the conduit.

5. The sheath of claim 2 wherein the layer of insulative material comprises an inner conduit portion and the sensor strip is disposed on an outside surface of the inner conduit portion.

6. The sheath of claim 2 wherein the layer of insulative material comprises a conduit extruded from a polymeric material and the sensor strip is coextruded in a wall of the conduit.

7. The sheath of claim 2 wherein the layer of insulative material comprises a conduit made of a flexible polymeric material and the conduit comprises a longitudinal slit providing access for said plurality of electrical conductors through the slit.

8. The sheath of claim 3 wherein the helical pattern comprises a pitch of at least one turn for each sheath length of 20 sheath diameters.

9. The sheath of claim 3 wherein the layer of insulative material comprises an inner wrapped layer of tape and an outer wrapped layer of tape and said at least one sensor strip is disposed between the inner wrapped layer of tape and the outer wrapped layer of tape.

10. The sheath of claim 3 wherein the layer of insulative material comprises an inner wrapped layer of tape, an intermediate wrapped layer of tape, and an outer wrapped layer of tape and a first sensor strip is disposed in a helical pattern between the inner wrapped layer of tape and the intermediate wrapped layer of tape and a second sensor strip is disposed in a helical pattern between the intermediate wrapped layer of tape and the outer wrapped layer of tape.

11. The sheath of claim 5 comprising an insulative coating over the inner conduit portion.

12. The sheath of claim 10 wherein the first sensor strip and the second sensor strip are connected at one end of the sheath.

13. The sheath of claim 10 wherein the first sensor strip and the second sensor strip form a two layer wrap continuous from a first end of the sheath to a second end and back to the first end.

14. A sheath for providing overtemperature and mechanical damage sensing for a plurality of electrical conductors, the sheath comprising:

a layer of insulative material positionable to substantially surround said plurality of electrical conductors; and at least two sensor strips in communication with the layer of insulative material, each of said at least two sensor strips extending a length of said plurality of electrical conductors, a first of said at least two sensor strips made of a conductive polymer material comprising a positive temperature coefficient of resistivity which increases with temperature, and a second of said at least two sensor strips disposed between an outside surface of the sheath and said plurality of electrical conductors so that mechanical damage originating on an outside surface will result in mechanical damage to said second of said at least two sensor strips before mechanical damage is sustained to said plurality of electrical conductors.

15. The sheath of claim 14 wherein the positive temperature coefficient of resistivity increases at a rate with temperature so as to comprise a switching temperature.

16. The sheath of claim 15 wherein the insulative material is a conduit and said at least two sensor strips are spaced radially about a longitudinal axis of the conduit.

17. The sheath of claim 15 comprising at least four sensor strips disposed in the conduit and spaced radially about a longitudinal axis of the conduit.

18. A preformed harness for providing overtemperature and mechanical damage sensing for a plurality of electrical conductors, the harness comprising:
  a molded body comprising a feed end, a main distributor end and an auxiliary distributor end;
  a plurality of conductors disposed in the molded body, at least one conductor exiting each of said feed end, main distributor end, and auxiliary end;
  at least one sensor strip disposed in the molded body in a mechanical damage sensing pattern between said feed end, said main distributor end, and said auxiliary end whereby mechanical damage occurring from the outside surface of the molded body will open the sensor strip before at least one of said plurality of conductors is damaged, and wherein at least a portion of the sensor strip comprises a material having a temperature coefficient of resistivity which increases with temperature.

19. The harness of claim 18 wherein the positive temperature coefficient of resistivity increases at a rate with temperature so as to comprise a switching temperature.

20. The harness of claim 19 wherein said mechanical damage sensing pattern is a helical pattern with respect to said plurality of electrical conductors.

21. A method for forming a mechanical damage and overtemperature sensing sheath over a plurality of electrical conductors, the method comprising the steps of:
  assembling said plurality of electrical conductors in a bundle;
  positioning at least one sensor strip in a mechanical damage sensing pattern over the bundle, said at least one sensor strip extending over a first substantial length of the bundle and comprising a positive temperature coefficient of resistivity which increases with temperature, the magnitude of increase in positive coefficient of resistivity sufficient to provide a switching temperature and wherein the mechanical damage sensing pattern over the bundle provides a mechanical damage sensing function by opening said at least one sensor strip upon mechanical damage occurring outside the bundle before said plurality of conductors in the bundle are damaged.

22. The method of claim 21 wherein positioning at least one sensor strip in a mechanical damage sensing pattern over the bundle comprises wrapping said at least one sensor strip in a helical pattern with respect to a longitudinal axis of said plurality of conductors.

23. The method of claim 22 comprising the additional step of wrapping at least one layer of insulative tape around the bundle in a helical pattern and extending a second length of the bundle, the additional step performed before the positioning of said at least one sensor strip.

24. The method of claim 22 comprising the additional step of wrapping at least one layer of insulative tape around said at least one sensor strip in a helical pattern and extending a second length of the bundle, the additional step performed after the positioning of said at least one sensor strip.

25. The method of claim 22 comprising the additional step of wrapping at least one layer of a first insulative tape around the bundle in a helical pattern, the first insulative tape extending a second substantial length of the bundle and before the positioning of said at least one sensor strip and comprising the second additional step of wrapping at least one layer of a second insulative tape around said at least one sensor strip in a helical pattern, the second insulative tape extending a third substantial length of the bundle, and after the positioning of said at least one sensor strip.

26. The method of claim 22 wherein the helical pattern comprises a pitch of at least one turn for each sheath length of 20 sheath diameters.

27. The method of claim 22 wherein the helical pattern comprises a pitch of at least one turn for each sheath length of 10 sheath diameters.

28. The method of claim 22 wherein the helical pattern comprises a pitch of at least one turn for each sheath length of 5 sheath diameters.

29. The method of claim 22 wherein the helical pattern comprises a pitch of at least one turn for each sheath length of 2 sheath diameters.

30. The method of claim 25 wherein the helical pattern comprises a pitch of at least one turn for each sheath length of 20 sheath diameters and the first substantial length is at least 10 percent of the sheath length.

31. A method for forming a mechanical damage and overtemperature sensing sheath over a bundle of insulated electrical conductors, the method comprising the steps of:
  disposing at least two sensor strips in a mechanical damage sensing pattern in an insulative conduit, each of said at least two sensor strips extending over a first length of the conduit and at least one of said at least two sensor strips comprising a positive temperature coefficient of resistivity which increases with temperature, the magnitude of increase in positive coefficient of resistivity sufficient to provide a switching temperature; and
  inserting a bundle of insulated electrical conductors into the conduit;
  whereby the pattern in the insulative conduit provides a mechanical damage sensing function by opening upon mechanical damage occurring outside the bundle before said plurality of conductors in the bundle are damaged.

32. The method of claim 31 wherein the mechanical damage sensing pattern comprises at least four sensor strips spaced radially about a longitudinal centerline of the conduit.

* * * * *